US011461181B2

(12) United States Patent
Singh et al.

(10) Patent No.: US 11,461,181 B2
(45) Date of Patent: Oct. 4, 2022

(54) METHODS AND SYSTEMS FOR PROTECTING MULTITENANT DATABASES IN NETWORKED STORAGE SYSTEMS

(71) Applicant: NETAPP, INC., Sunnyvale, CA (US)

(72) Inventors: Uttam Singh, Bengaluru (IN); Vasantha Sadananda Prabhu, Bengaluru (IN); Ebin Varghese Kadavy, Bengaluru (IN); Yogesh Basavani Suresh, Bengaluru (IN); Anurag Kumar, Bengaluru (IN); Shivananda Kn, Bengaluru (IN)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 17/166,830

(22) Filed: Feb. 3, 2021

(65) Prior Publication Data

US 2022/0245032 A1 Aug. 4, 2022

(51) Int. Cl.
*G06F 16/20* (2019.01)
*G06F 11/14* (2006.01)
*G06F 16/27* (2019.01)

(52) U.S. Cl.
CPC ........ *G06F 11/1451* (2013.01); *G06F 16/275* (2019.01); *G06F 2201/80* (2013.01); *G06F 2201/82* (2013.01)

(58) Field of Classification Search
None
See application file for complete search history.

(56) References Cited

U.S. PATENT DOCUMENTS

| 7,885,938 | B1 | 2/2011 | Greene et al. |
| 10,198,327 | B1 | 2/2019 | Gopinath et al. |
| 2008/0162491 | A1* | 7/2008 | Becker .................. G06F 16/275 |
| 2015/0254142 | A1 | 9/2015 | Wagmann |
| 2018/0373604 | A1 | 12/2018 | Martin et al. |

(Continued)

OTHER PUBLICATIONS

"Cloning a PDB or Non-CDB"; From the Internet; Printed on Feb. 11, 2021; 12 pages; https://docs.oracle.com/en/database/oracle/oracle-database/18/multi/cloning-a-pdb.html#GUID-8A6287A1-14E5-4B45-972F-FC2FB3CDCF8B.

(Continued)

*Primary Examiner* — Belix M Ortiz Ditren
(74) *Attorney, Agent, or Firm* — Loza & Loza, LLP; Tejinder Singh

(57) ABSTRACT

Methods and systems for protecting a multitenant database system with multiple tenant databases are provided. One method includes accessing, by a processor, a backup of a source container database of a multitenant database system, the source container database hosting a plurality of tenant databases; generating, by the processor, a clone of the source container database from the backup, the clone of the source container database including clones of the plurality of tenant databases; exporting, by the processor, configuration information of a clone of a first tenant database from the clone of the source container database to a target container database; importing, by the processor, the clone of the first tenant database into the target container database; and removing, by the processor, the clone of the first tenant database from the cloned source container database, while retaining data files associated with the first tenant database.

20 Claims, 12 Drawing Sheets

(56) References Cited

U.S. PATENT DOCUMENTS

2019/0311040 A1 10/2019 Nayak et al.
2021/0191903 A1 6/2021 Shetty et al.

OTHER PUBLICATIONS

Hall, Tim; "Multitenant: Overview of Container Databases (CDB) and Pluggable Databases (PDB)"; Printed on Dec. 2, 2020; 8 pages; https://oracle-base.com/articles/12c/multitenant-overview-container-database-cdb-12cr1.
Bauer et al.; SAP HANA on NetApp FAS Systems with Fibre Channel Protocol; NetApp; Sep. 2019; TR-4384; 34 pages.

* cited by examiner

METHODS AND SYSTEMS FOR PROTECTING MULTITENANT DATABASES IN NETWORKED STORAGE SYSTEMS

TECHNICAL FIELD

The present disclosure relates to networked storage systems and more particularly to, cloning a tenant database from a backup copy of a multitenant database.

BACKGROUND

Various forms of storage systems are used today. These forms include direct attached storage (DAS) systems, network attached storage (NAS) systems, storage area networks (SANs), and others. Network storage systems are commonly used for a variety of purposes, such as providing multiple users with access to shared data, backing up data and others. A storage system typically includes at least one computing system executing a storage operating system for storing and retrieving data on behalf of one or more client computing systems ("clients"). The storage operating system stores and manages shared data containers in a set of mass storage devices. Storage systems are used by different applications, for example, multitenant database systems, electronic mail (email) servers, virtual machines executed within virtual machine environments (for example, a hypervisor operating environment) and others to store and protect data using backups.

A multitenant database system enables a plurality of independent tenant databases to store information using a single database container (or instance). An example of a multitenant database system is provided by Oracle Corporation (without derogation of any trademark rights). The multitenant database system has a container database (CDB) as a "master database", to enable access to a plurality of tenant databases, may also be referred to as "pluggable databases ("PDBs")", throughout this specification. The CDB is typically presented by a computing device (also referred to as a host system) or within a virtual machine hosted by the computing device. The CDB operates as an independent logical entity to store configuration information regarding each PDB. The PDBs operate as independent databases to store data. The CDB and the PDBs may be protected by taking point in time backups (also referred to as "snapshots") by the storage system.

Conventional database providers and storage systems may store backups of CDBs and PDBs, but typically, fail to efficiently enable cloning a specific PDB from a backup copy of a source CDB and present the PDB clone at a target CDB that may be hosted at a different or same host system as the source CDB. For example, Oracle Corporation provides a limited option for taking snapshot of a PDB only for Network File System (NFS) and Oracle Automatic Storage Management Cluster File System (Oracle ACFS) but not for Storage Area Network (SAN) file systems that are extensively used by storage systems. Furthermore, if one wants to clone the PDB from the snapshot, then the source PDB must remain a read-only snapshot during the lifetime of the PDB clone. This limitation is undesirable because it limits a user's ability to use the source PDB as a read-write PDB. The Oracle Corporation solution also requires that the PDB can only be cloned when the source CDB is shutdown, and the PDB clone can only be hosted on the same host system that hosts the source CDB. This limits a user's ability to use a PDB clone on an alternate host without affecting the source CDB or the source CDB host. Continuous efforts are being made to develop computing technology to efficiently use a source CDB backup taken by a storage system to enable cloning a PDB from the source CDB backup, and then present the PDB clone on a target CDB hosted by a different host computing device or the same device as the source CDB. It is also desirable that the storage system efficiently manage the overall life cycle of the PDB clone regardless of whether the source CDB is operational or shutdown. It is also desirable that the PDB cloning process to be storage space efficient and can be performed without having to copy PDB files from the source CDB backup to the PDB clone.

BRIEF DESCRIPTION OF THE DRAWINGS

The foregoing features and other features will now be described with reference to the drawings of the various aspects of the present disclosure. In the drawings, the same components have the same reference numerals. The illustrated aspects are intended to illustrate, but not to limit the present disclosure. The drawings include the following Figures.

DETAILED DESCRIPTION

Figure 1A:
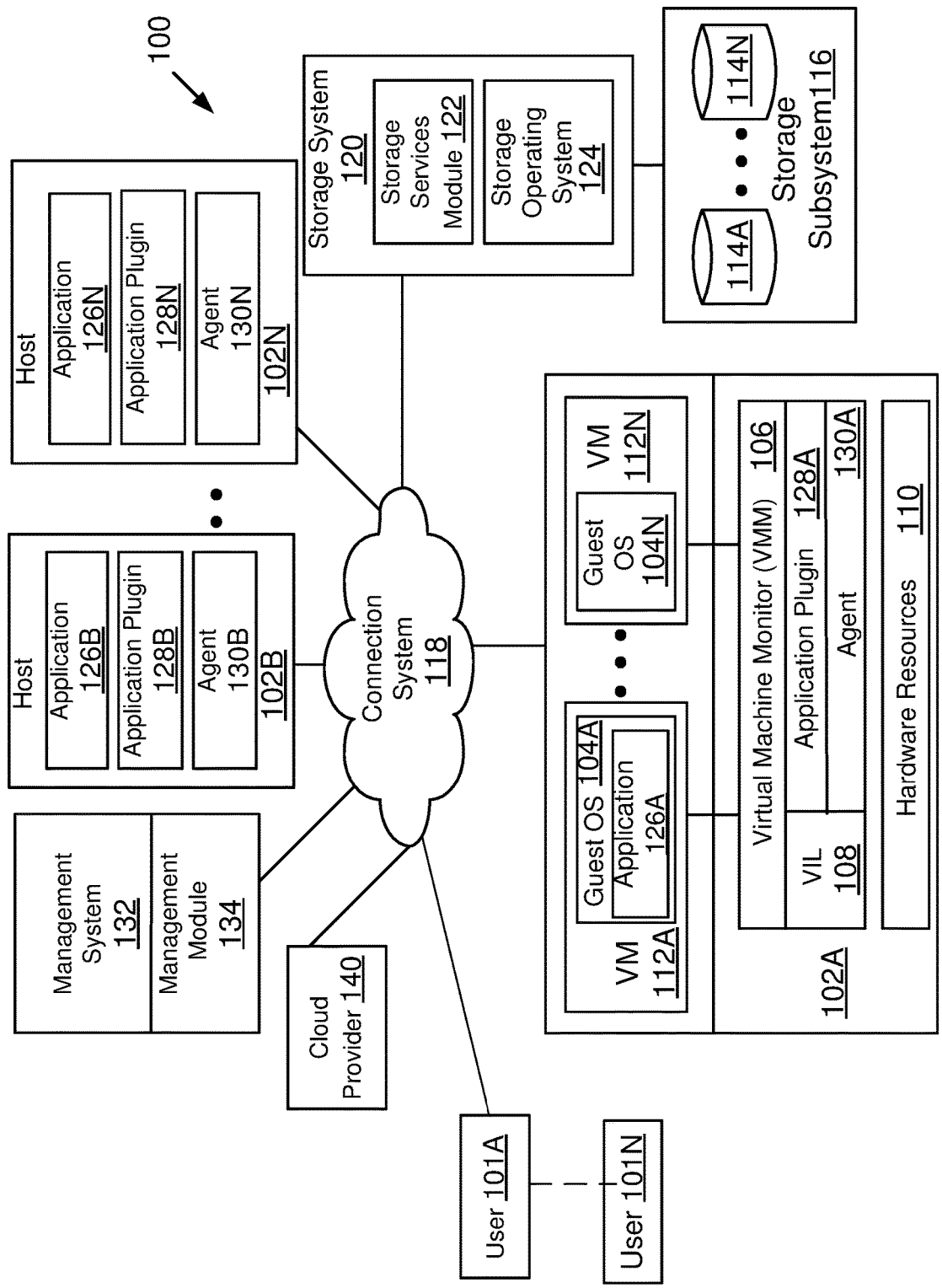
FIG. 1A shows an example of an operating environment for the various aspects of the present disclosure.

In one aspect, innovative data protection technology is provided for a multitenant database system that includes at least a container database (CDB) and a tenant database (or a pluggable database ("PDB"). A source CDB with one or more PDBs is frequently backed up by a storage system (may also be referred to as a storage server, storage controller or storage node). The storage system takes snapshots, i.e. a point-in-time copy of a storage volume that stores the source CDB. The point-in-time copy captures the source CDB and PDB information in a snapshot. When a user wants to clone a specific PDB from a backup copy, the user selects the backup and identifies a target CDB for hosting/receiving the clone PDB. The source CDB and the target CDB can be the same or different, hosted by different computing devices or a same computing device. A clone of the source CDB with a clone of the PDB is created from the backup copy and configuration data of the PDB clone is exported to the target CDB. The clone PDB is imported to the target CDB with a different name than the PDB. Once the PDB clone is imported, any other PDBs in the source CDB clone and the source CDB clone. By deleting the source CDB clone, the storage system does not waste any storage space. The PDB cloning process occurs independent of the source CDB i.e. the source CDB can be operational and the user can clone a PDB from the source CDB snapshot. Furthermore, the innovative technology of the present disclosure enables life cycle management of the PDB clone independent of the source PDB as well as the source CDB. The term life cycle of the PDB clone means generating the PDB clone and deleting the PDB clone on demand by a user, after the purpose of PDB clone is accomplished.

In one aspect, the PDB cloning process using a source CDB snapshot does not involve copying the data files of the PDB from the PDB clone to the target CDB. Instead, a pointer to the PDB clone is redirected to the target CDB. This is enabled using "flexclone" technology described below in detail. This contrasts with the limited inefficient solutions provided by database providers that copy files to generate a PDB clone. The copying operation can take a long time, especially if the PDB size is large, e.g. 1 terra bytes (TB) or more, which is not uncommon for PDBs. Furthermore, by not copying files, the present solution is storage space efficient because duplicate copies are not used for the clone.

Briefly, in one aspect, innovative computing technology enables a user to select a PDB to clone from a backup copy of a CDB, select a target computing device and a target CDB. A CDB clone is created from the backup copy, the CDB clone is recovered from the backup copy to a specific point in time, any other PDBs are dropped from the recovered CDB, the desired PDB configuration is exported to a file, the PDB is dropped from the recovered CDB, while data files of the PDB are retained, and the PDB clone is then imported to the target CDB. Then access to the PDB clone is provided from the target CDB. The cloning process is executed by one or more processor executable plugins as described below in detail.

As preliminary note, the terms "component", "module", "system," and the like as used herein are intended to refer to a computer-related entity, either software-executing general-purpose processor, hardware, firmware and a combination thereof. For example, a component multitenant, but is not limited to being, a process running on a processor, a hardware-based processor, an object, an executable, a thread of execution, a program, and/or a computer.

By way of illustration, both an application running on a server and the server may be a component. One or more components may reside within a process and/or thread of execution, and a component multitenant localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components may be stored, for example, at non-transitory, computer readable media including, but not limited to, an ASIC (application specific integrated circuit), CD (compact disc), DVD (digital video disk), ROM (read only memory), solid state drive, hard disk, EEPROM (electrically erasable programmable read only memory), non-volatile memory or any other storage device, in accordance with the claimed subject matter.

System 100: FIG. 1A shows an example of a system 100, to implement the various adaptive aspects of the present disclosure. In one aspect, system 100 includes one or more computing systems 102A-102N (shown as host 102A-102N and may also be referred to as a "host system 102", "host systems 102", "server 102" or "servers 102") communicably coupled to a storage system 120 executing a storage operating system 124 and a storage services module 122 via a connection system 118 such as a local area network (LAN), wide area network (WAN), the Internet and others. As described herein, the term "communicably coupled" may refer to a direct connection, a network connection, or other connections to provide data-access service to user consoles (or computing devices) 101A-101N (may also be referred to as "user 101," "users 101," "client system 101" or "client systems 101"). A cloud provider 140 (may also be referred to as a cloud manager, where cloud computing is utilized) may be used to provide storage to clients.

Client systems 101 are computing devices that can access storage space at the storage system 120 via the connection system 118. The storage may be presented by the cloud provider 140 or any other entity. A client may be the entire system of a company, a department, a project unit or any other entity. Each client system is uniquely identified and, optionally, may be a part of a logical structure called a storage tenant. The storage tenant represents a set of users (may also be referred to as storage consumers) for the cloud provider 140 that provides access to storage system 120. It is noteworthy that the adaptive aspects of the present disclosure are not limited to using a cloud provider or a storage tenant, and instead, may be implemented for direct client access.

System 100 also includes a management system 132 that executes instructions for a management module (or application) 134 for coordinating storage services related operations (for example, backups, restore, cloning of a PDB from a backup copy of a source CDB and other operations) for a multitenant database environment, described below in detail. Although the management system 132 with the management module 134 is shown as a stand-alone module, it may be implemented with other applications, for example, within a virtual machine environment described below. Furthermore, the management system 132 and the management module 134 may also be referred to interchangeably throughout this specification.

In one aspect, host systems 102 are configured to execute a plurality of processor-executable applications 126A-126N (may also be referred to as "application 126" or "applications 126"), for example, a database application, including a multitenant database application, an email server, and others. These applications may be executed in different operating environments, for example, a virtual machine environment, Windows, Solaris, Unix (without derogation of any third-party rights) and others. The applications 126 use storage system 120 to store information at storage devices, as described below.

To protect information associated with each application, a plugin module (shown as application plugins 128A-128N) are executed at host systems 102. The term plugin as used in this specification means a processor executable layer that is customized to interface with a specific application, e.g. a multitenant database application, a file system, an operating system, virtual machine monitor layer and others, described below in detail. The term protect means to backup an application and/or backup associated information (including configuration information, data (e.g. files, directories, structured or unstructured data, may jointly be referred to as data containers) and others).

Each host system 102 executes an agent 130A-130N that interfaces with the management module 134 and the various application plugins for managing backups, restore, cloning and other operations, as described below in detail.

In one aspect, the storage system 120 has access to a set of mass storage devices 114A-114N (may also be referred to as "storage devices 114" or "storage device 114") within at least one storage subsystem 116. The storage devices 114 may include writable storage device media such as solid state drives, storage class memory, magnetic disks, video tape, optical, DVD, magnetic tape, non-volatile memory devices, for example, self-encrypting drives, or any other storage media adapted to store structured or non-structured data. The storage devices 114 maybe organized as one or more groups of Redundant Array of Independent (or Inexpensive) Disks (RAID). The various aspects disclosed are not limited to any specific storage device or storage device configuration.

The storage system 120 provides a set of storage volumes (may also be referred to as "volumes") directly or via the cloud provider 140 to host systems 102 via the connection system 118. The storage operating system 124 presents or export data stored at storage devices 114 as a volume (or a logical unit number (LUN) for storage area network ("SAN") based storage). Each volume may be configured to store data files (or data containers or data objects), scripts, word processing documents, executable programs, and any other type of structured or unstructured data. From the perspective of one of the client systems, each volume can appear to be a single storage drive. However, each volume can represent the storage space in one storage device, an aggregate of some or all the storage space in multiple storage devices, a RAID group, or any other suitable set of storage space. An aggregate is typically managed by the storage operating system 124 and identified by a unique identifier (not shown).

The storage system 120 is used to store and manage information at storage devices 114 based on a request generated by application 126 executed by host system 102 or any other entity. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols for SAN storage, for example, the Small Computer Systems Interface (SCSI) protocol encapsulated over TCP (iSCSI) and SCSI encapsulated over Fibre Channel (FC), object-based protocol or any other protocol.

In a typical mode of operation, one or more input/output (I/O) requests are sent over connection system 118 to the storage system 120. Storage system 120 receives the I/O requests, issues one or more I/O commands to storage devices 114 to read or write the data on behalf of the host system 102, and issues a response containing the requested data over the network 118 to the respective host system 102.

Although storage system 120 is shown as a stand-alone system, i.e. a non-cluster-based system, in another aspect, storage system 120 may have a distributed architecture; for example, a cluster-based system that may include a separate network module and storage module. Briefly, the network module is used to communicate with host systems 102, while the storage module is used to communicate with the storage devices 114, as described below with respect to FIG. 2A.

Alternatively, storage system 120 may have an integrated architecture, where the network and data components are included within a single chassis. The storage system 120 further may be coupled through a switching fabric to other similar storage systems (not shown) which have their own local storage subsystems. In this way, all the storage subsystems can form a single storage pool, to which any client of any of the storage servers has access.

In one aspect, the storage services module 122 at the storage system 120 coordinates storage volume backups, cloning, restore and replication for different hosts and different applications. Although the storage services module 122 is shown as a single block, it may include various modules for taking backups, executing restore operations, replicating backups from one location to another and so forth. As described below, backups, cloning and other operations may be performed using the management system 132 and the management module 134. As an example, taking backups may include taking snapshots, i.e. a point-in-time copy of a storage volume. The point-in-time copy captures all the information in a storage volume. The snapshot may be used to clone a PDB, as described below in detail. It is noteworthy that the snapshot can be regardless of the file system used by the host 102 i.e. the snapshot is not limited to NFS or ACFS using proprietary data layout and instead can be taken for SAN based file systems, e.g. Ext3/Ext4 SAN filesystems.

One or more of the host systems (for example, 102A) may execute a virtual machine environment where a physical resource is time-shared among a plurality of independently operating processor executable virtual machines (also referred to as VMs). Each VM may function as a self-contained platform, running its own operating system (OS) and computer executable, application software. The computer executable instructions running in a VM may also be collectively referred to herein as "guest software." In addition, resources available within the VM may also be referred to herein as "guest resources."

The guest software expects to operate as if it were running on a dedicated computer rather than in a VM. That is, the guest software expects to control various events and have access to hardware resources on a physical computing system (may also be referred to as a host system) which may also be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

Referring to FIG. 1A, host system 102A provides a processor executable virtual machine environment executing a plurality of VMs 112A-112N. VMs 112A-112N execute a plurality of guest operating systems 104A-104N

(may also be referred to as guest OS 104) that share hardware resources 110. As described above, hardware resources 110 may include CPU, memory, I/O devices, storage or any other hardware resource.

In one aspect, host system 102A may also include a virtual machine monitor (VMM) 106, for example, a processor executed hypervisor layer provided by VMWare Inc., Hyper-V layer provided by Microsoft Corporation of Redmond, Wash. or any other layer type (without derogation of any third-party trademark rights). VMM 106 presents and manages the plurality of guest OS 104A-104N executed by the host system 102A.

In one aspect, VMM 106 is executed by host system 102A with VMs 112A-112N. In another aspect, VMM 106 may be executed by an independent stand-alone computing system, often referred to as a hypervisor server or VMM server and VMs 112A-112N are presented on another computing system.

It is noteworthy that various vendors provide different virtualization environments, for example, VMware Corporation, Microsoft Corporation and others (without derogation of any third-party trademark rights). The generic virtualization environment described above with respect to FIG. 1A may be customized depending on the virtual environment provider.

VMM 106 may include or interface with a virtualization layer (VIL) 108 that provides one or more virtualized hardware resource 110 to each OS 104A-104N. VMM 106 also includes or interfaces with a hypervisor plugin (shown as application plugin 128A) and the agent 130A.

Figure 1B:
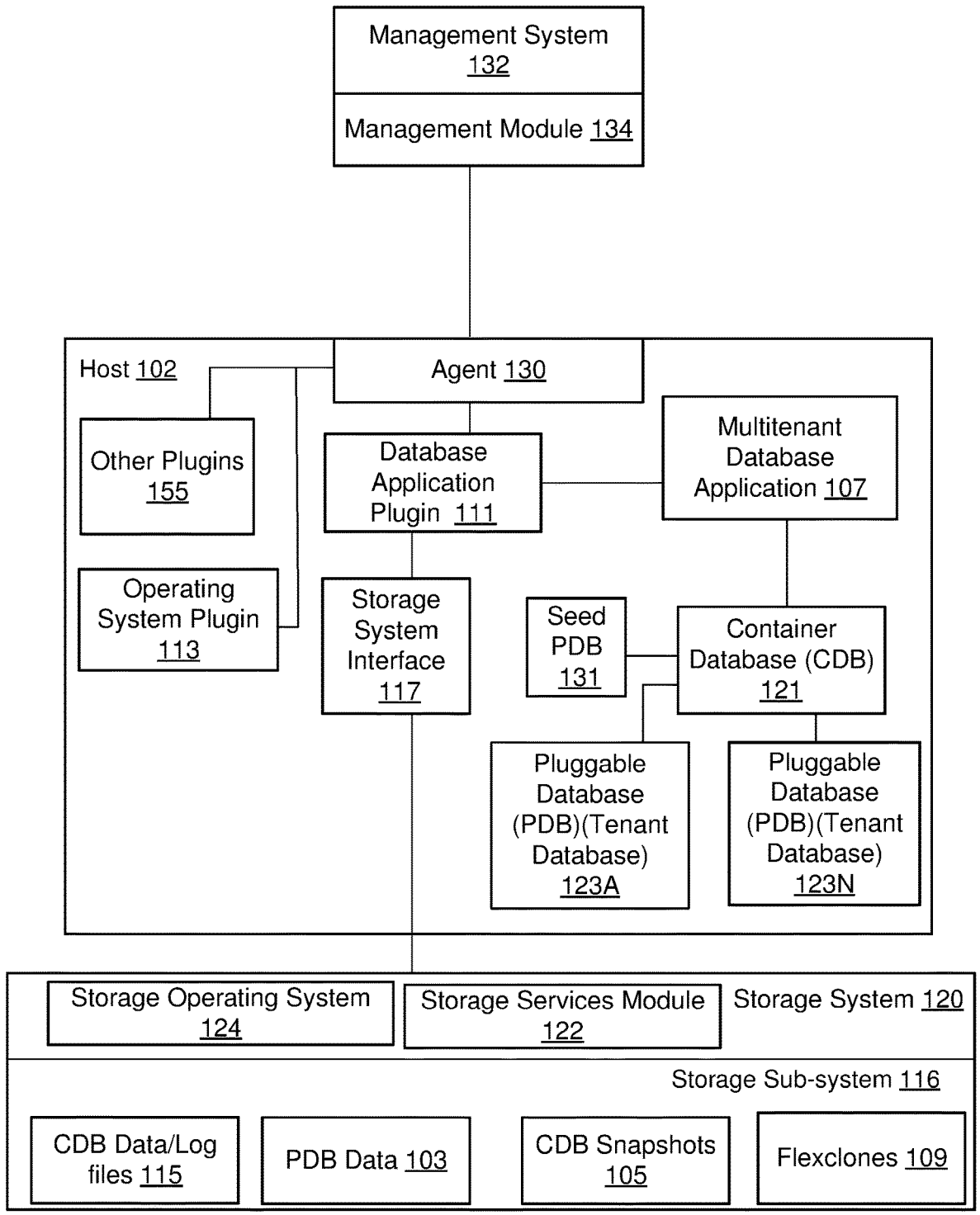
FIG. 1B shows an example of a host system executing a multitenant database system, according to one aspect of the present disclosure.

FIG. 1B shows an example of a portion of system 100 for selectively cloning a PDB from a backup copy of a CDB of a multitenant database system taken by the storage system 120 using the management module 134, described below in detail. In one aspect, host 102 executes a multitenant database application 107 (may also be referred to as "application 107") that maintains a CDB (may also be referred to as "system database," or "master database,") 121 with PDBs 123A-123N (maybe referred to as "tenant database 123," "tenant databases 123," "PDB 123," or "PDBs 123"). The data files or any other information for each PDB 123 is stored by the storage system 120 using the storage operating system 124.

The CDB 121 includes schemas, schema objects and non-schema objects that are used across all PDBs 123. The CDB 121 includes a root container that stores metadata associated with all PDBs and common users. An example of metadata may include executable for a database package, e.g. a SQL package. A common user is a database user across every CDB container. The CDB also includes a "seed" PDB 131 that defines the overall format/template for creating PDBs 123. As an example, the CDB 121 is an Oracle Corp. (without derogation of any third-party rights) provided multitenant data container system database. It is noteworthy that the adaptive aspects of the present disclosure are not limited to Oracle multitenant database or any specific multitenant database.

In one aspect, PDB 123 is a database created by a user with a specific set of features. The overall format and layout of PDB 123 is based on the seed PDB 131 that can vary. For example, a PDB 123 may be configured to a specific application, such as a finance application, marketing application, engineering or sales application. PDBs 12.3 may be added to and deleted from CDB 121 by a user.

In one aspect, to protect PDBs 123, agent 130 (e.g. at host 102) interfaces with the management module 134 (at the management system 132) via a network connection. The agent 130 receives requests for storage services (e.g. taking a backup, restoring a CDB from a backup, and/or cloning a specific PDB at a target CDB) either from the management system 132 or any other entity. The agent 130 provides the requests to a database application plugin (e.g. an Oracle plugin) 111 (may also be referred to as "plugin 111"). The plugin 111 is customized for database application 107 and interfaces with application 107 to perform database related discovery, backup, clone and restore operations, as described below in detail. The plugin 111 also interfaces with an operating system plugin (e.g. a Unix plugin) 113 for retrieving any operating system related information for executing storage services for host 102. A storage system interface (may also be referred to as a "file system plugin") 117 interfaces with the storage system 120 to send and receive storage related information, as described below in detail. The host 102 may also execute other plugins 155, besides plugins 111 and 113.

In one aspect, the storage system stores CDB data and log files 115, PDB data files 103, CDB snapshots 105 and any flexclones 109 that are created from a CDB snapshot 105. Details of cloning a PDB from a CDB backup are provided below with respect to FIGS. 1E-1F.

Figure 1C:
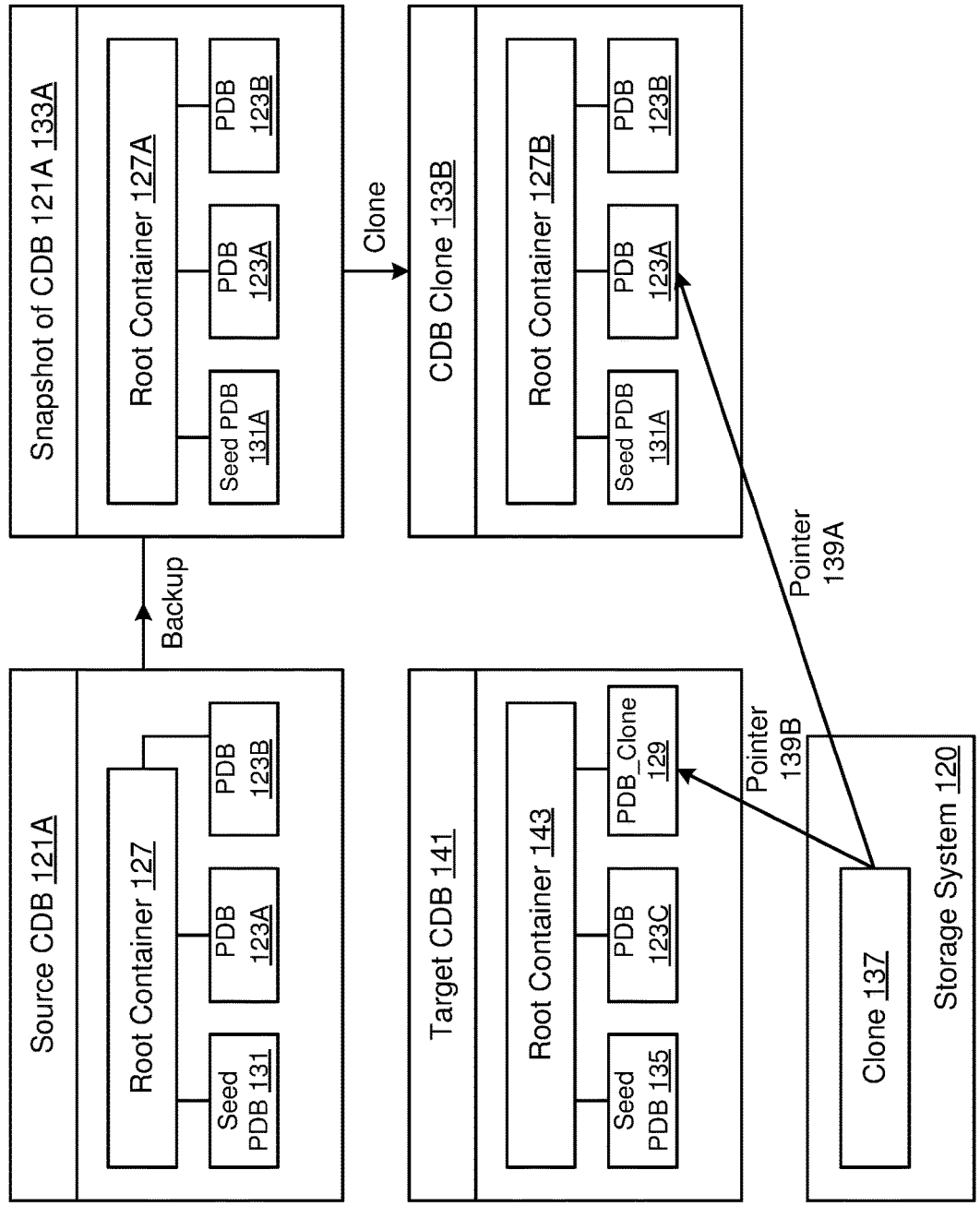
FIG. 1C shows an example of cloning a tenant database from a backup of a multitenant database, according to one aspect of the present disclosure.

Selective PDB Cloning: FIG. 1C shows an example of the innovative technology for cloning a PDB from a backup copy of a CDB, according to one aspect of the present disclosure. As an example, a source CDB 121A is hosted by a computing device (e.g. 102B, FIG. 1A). The source CDB 121A includes a root container 127, a seed PDB 131 that is used to generate, e.g., PDBs 123A and 123B. The two PDBs are shown as an example, the innovative features of the present disclosure may be implemented using fewer or more than two PDBs. The PDBs 123A and PDB 123B operate as independent logical entities within the source CDB 121A.

To protect source CDB 121A and the PDBs 123A/123B, a backup is taken by the storage system 120 using plugins 111, 113 and 117, as described below in detail. The logical representation of the backup is shown as snapshot 133A, which includes the root container 127A, which is a backup of root container 127, the seed PDB 131A, which is a backup of the seed PDB 131 and backups of PDBs 123A/123B, shown for convenience as PDBs 123A/123B. In one aspect, the backup of source CDB 121A is taken by the storage operating system 124 by taking snapshots of one or more storage volumes that store the source CDB 121A.

The backup process includes a multi-phase, discovery operation that is initiated by a discovery module 186 (see FIG. 1I) and executed by the plugin 111 interfacing with the database application 107 and the storage system interface 117. During a first phase of the discovery operation, the plugin 111 first requests high level details from the source CDB 121A e.g. a unique system identifier that uniquely identifies source CDB 121A, names of each PDB 123A-123B, configuration information of CDB 121A, and PDBs 123A-123B, or any other information. The configuration information indicates to the plugin 111 the type of database 121A (e.g. whether the database supports multi-tenancy) and whether the source CDB 121A and the PDBs 123A-123B are configured on a single or multiple host 102.

The second phase of the discovery operation involves authenticating user credentials provided by the database application 107 to access the source CDB 121A. The user credentials maybe authenticated by the agent 130 and/or plugin 111. Once the user credentials are authenticated, the plugin 111 generates a query for the source CDB 121A with the user credentials. The query requests file paths for PDBs 123A/123B indicating where each PDB is stored. The root container 127 maintains the file paths for each PDB to provide access to the PDBs. The plugin 111 then stores a mapping of the individual files of each PDB with their respective file paths. This information may be stored at a mapping data structure (not shown) at host 102 memory. Thereafter, the plugin 111 uses the file paths and the mapping information to request the storage layout of each PDB from the storage system interface 117 that communicates with the storage system 120.

The storage layout information defines how each PDB is stored by the storage system 120 at the storage devices 114. The storage system interface 117 obtains a mount point for a storage volume associated with each PDB. A mount point is a drive or volume in an operating system that is mounted to a folder that uses a file system. When SAN is used for storing the PDBs 123A/123B, the storage layout provides a LUN name that identifies a LUN that stores the PDBs, identity of a storage volume associated with the LUN, LUN size, identity of a storage server that manages the LUN, permissions associated with the LUN or any other LUN configuration details. For non-SAN based storage (e.g. Networked Attached Storage (NAS) accessed using NFS or CIFS protocols), the storage layout information includes an identity of each data volume storing PDBs 123A/123B files, a size of each data volume, or any other configuration details. The discovered information is then persistently stored (e.g. at a database 176 shown in FIG. 1H and described below) and used for a cloning/restore operation.

A backup of the source CDB 121A and the PDBs 123A/123B is taken after a quiesce request is initiated by the plugin 111 for the database application 107. Thereafter, a snapshot of a storage volume is taken by the storage system 120 using the storage services module 122 (FIG. 1A) and the metadata is stored at a database 176 shown in FIG. 1H. The metadata includes a snapshot identifier, a size of the snapshot, a location where the snapshot is stored, time the snapshot was taken, name of the source CDB 121A and the PDBs 123A/123B, a host identifier that hosts the source CDB 121A or any other information. Thereafter, an unquiesce operation is executed by the database application 107 to make the source CDB 121A and the PDBs 123A/123B available for access and the backup operation is completed.

To clone a specific PDB, e.g. PDB 123A, a backup (e.g. 133A) is selected. A clone 133B is created and restored from the backup. The CDB clone 133B includes a clone of the root container 127A, a clone seed PDB 131A of seed PDB 131 and clones of PDB 123A/123B.

In one aspect, a recovery operation is executed to recover PDB 123A from the clone 133B. To perform the recovery operation, the entire clone 133B is recovered.

Figure 1D:
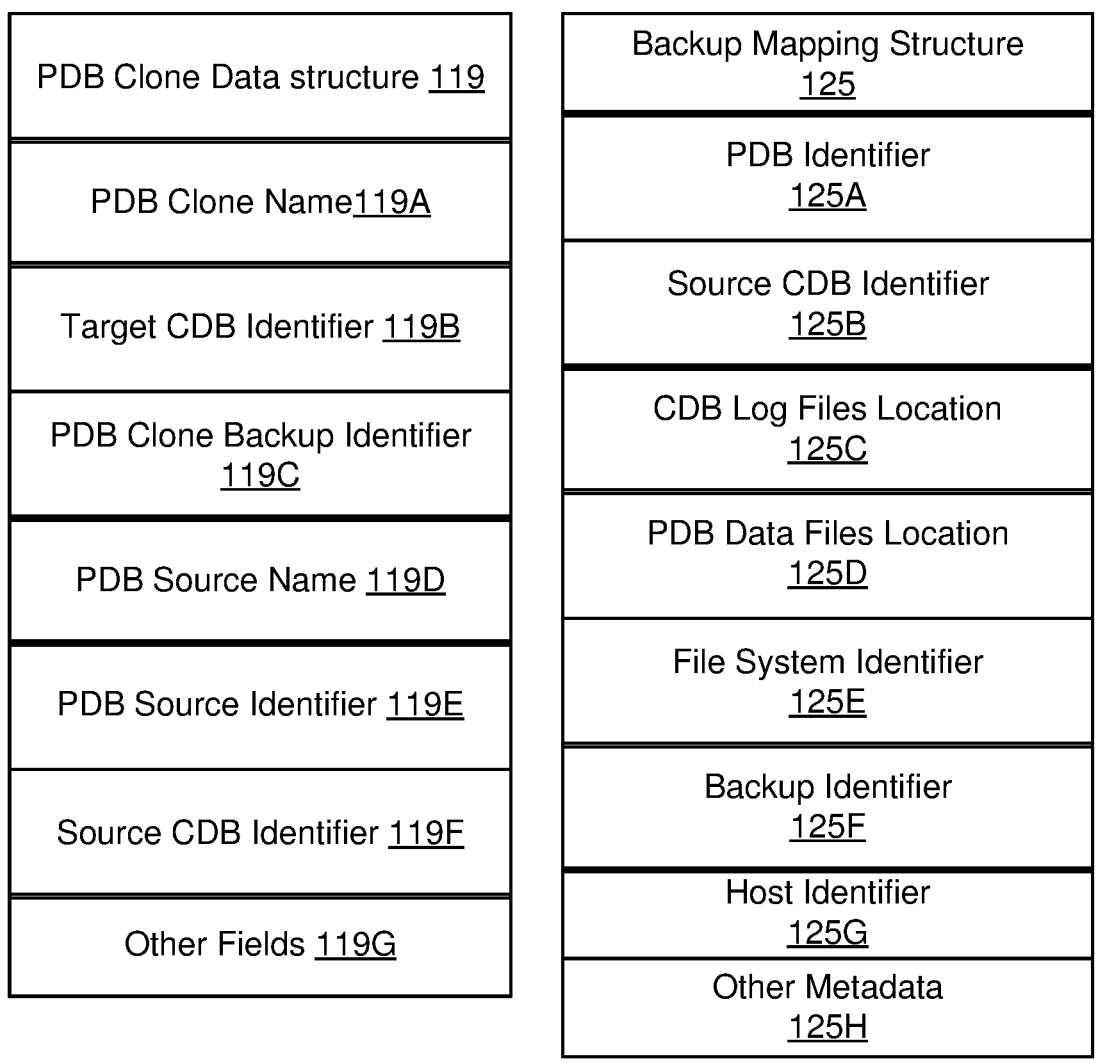
FIG. 1D shows an example of data structures used to clone a tenant database of a multitenant database, according to one aspect of the present disclosure.
Figure 1E:
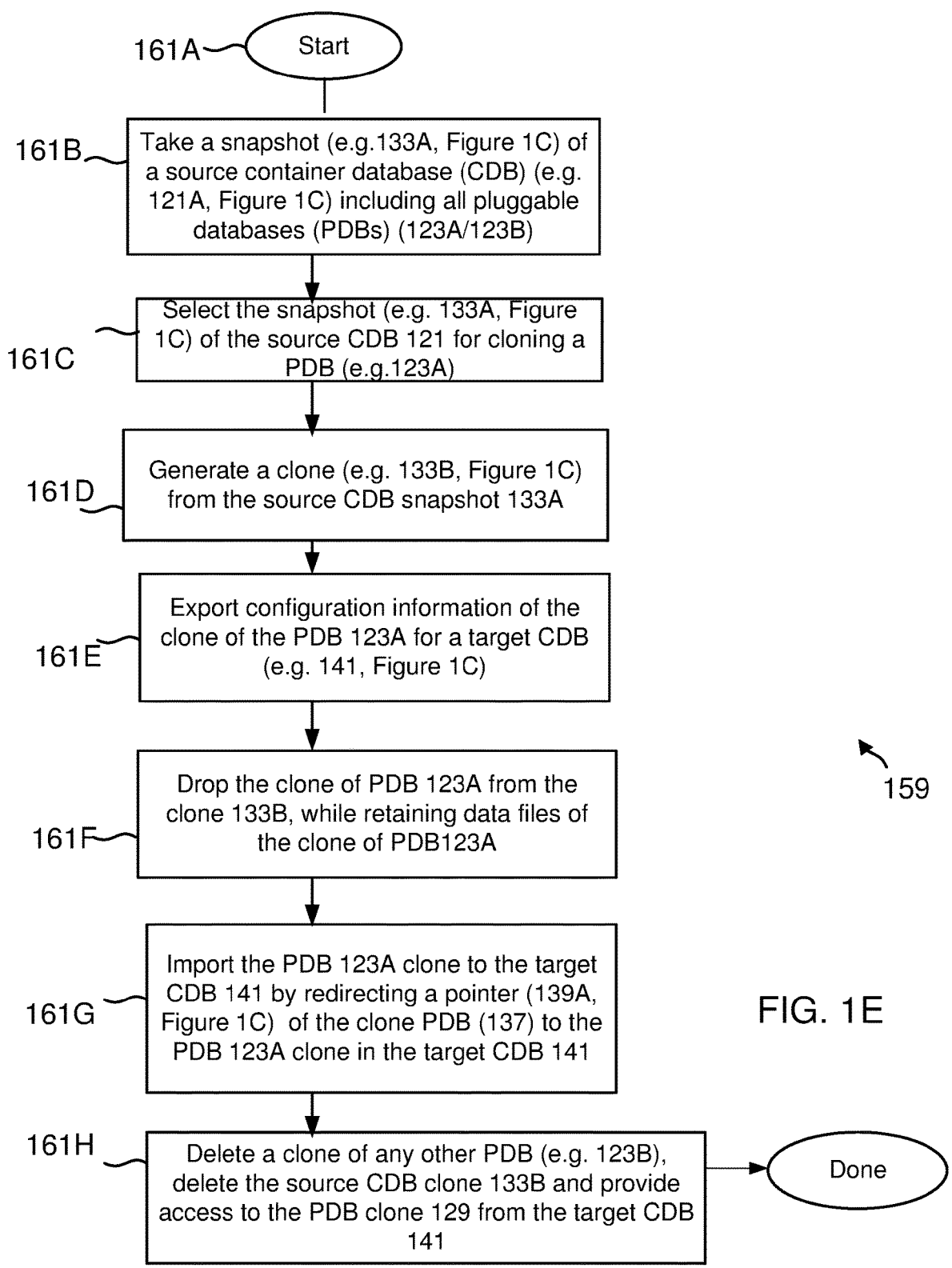
FIG. 1E shows a process for cloning a tenant database from a backup copy of a multitenant database, according to one aspect of the present disclosure.

The PDB 123A clone is maintained by the storage system 120 (shown as clone 137) and accessed by a pointer 139A. The configuration information of PDB 123A is exported and obtained for a target CDB 141. The PDB 123A is imported as a clone 129 into the target CDB 141 that can be hosted on a same host as the source CDB 121A or a different host. The import occurs by simply redirecting pointer 139A, shown as pointer 139B to PDB clone 129 i.e. no actual copying of PDB file occurs. This saves storage space because two copies of the PDB clone are not used, additionally, redirecting the pointer is faster than copying all PDB clone data, as performed in conventional data protection technology typically provided by database providers. The PDB clone 129 is named differently than PDB 123A. The PDB 123 clone from the CDB 133B is dropped, while data files 103 (FIG. 1B) are retained. The clone of PDB 123B is dropped from the CDB clone 133B and the associated data files are deleted. Thereafter, CDB clone 133B is deleted, which saves the storage space occupied by the CDB clone 133B. The PDB clone 129 is created regardless of whether the source CDB 121A is operational or shutdown. Furthermore, the PDB clone 129 life cycle can be managed using the cloning module 154 (FIG. 1H) and 199 (FIG. 1I). This provides flexibility to a user that may want to use the PDB clone 129 independent of the source PDB 123A and the source CDB 121.

It is noteworthy that although the target CDB 141 is shown as a separate entity from the source CDB 121A, the PDB clone 129 may also be presented by the source CDB 121A i.e. the source and the target CDB are the same.

Data Structures: FIG. 1D shows a backup mapping structure 125 (may also be referred to as "data structure 125") that maintains backup information for the source CDB 121A and the associated PDBs 123A-123B. As an example, data structure 125 stores a PDB identifier 125A that uniquely identifies each PDB 123A-123B; a source CDB identifier 125B that uniquely identifies the source CDB 121A, storage locations 125C for CDB log files and 125D for data files of each PDB, when applicable; a file system identifier 125E that identifies a file system that stores the backup, a backup identifier 125F (e.g. a snapshot identifier) identifying the backup 133A of the source CDB 121A and the associated PDBs; a host identifier 125G that identifies a computing system that hosts the source CDB 121A, and other metadata 125H, which may include backup size, backup type (i.e. a backup of log files and/or data files) or any other information. The adaptive aspects of the present disclosure may be implemented using fewer or more fields of data structure 125. The data structures are stored in the database 176 (FIG. 1H).

FIG. 1D also shows a PDB clone data structure 119 (may also be referred to as data structure 119), according to one aspect of the present disclosure. Data structure 119 includes a PDB clone name 119A that identifies the PDB clone 129 (FIG. 1C); a target CDB identifier 119B that identifies the target CDB 141, a PDB clone backup identifier 119C that identifies the backup of the PDB that is used to clone a PDB, a PDB source name 119D identifying the source PDB (e.g. 123A), a PDB source identifier 119E that uniquely identifies a source PDB, a source CDB identifier 119F that identifies the source CDB 121A, and other fields 119G that may include other information e.g. an identifier that identifies the PDB clone 129, access permissions for accessing the PDB clone or any other information. Although two data structures are shown in FIG. 1D as examples, the various aspects of the present disclosure may be implemented by using a single data structure or more than two data structures. The innovative aspects described herein are not limited to any number of data structures or specific data structure fields.

Process Flows: FIG. 1E shows a process 159 for cloning a PDB (e.g. 123A) from a snapshot (e.g. 133A) of a source CDB (e.g. 121A) taken by the storage system 120. The process blocks below are described with respect to the example of FIG. 1C. Process 159 begins in block 161A, when the source CDB 121A has been configured and presented by a host 102. The source CDB 121A includes PDBs 123A and 123B and the root container 127. The PDBs 123A/123B may include data files stored by storage system 120 (e.g. 103, FIG. 1B). A request to create the PDB clone 123A is received. The request may be received via a GUI module 142 (FIG. 1H) provided by the management module 134. An RBAC module 156 of management module 134 verifies if the user request can be processed, and a request is generated for agent 130 at host 102 to start the PDB clone workflow.

In block 161B, a snapshot 133A of the source CDB 121A is taken and stored. The backup details are stored in the data structure 125, described above in detail. It is noteworthy that the snapshot 133A is not limited to proprietary data layouts of a database provider or limited to specific file systems, e.g. NFS and ACFS.

In block 161C, the snapshot 133A is selected to clone PDB 123A. This may be based on a user request.

In block 161D, the snapshot 133A is cloned (133B, FIG. 1C). The clone 133B includes the root container 127B (i.e. a clone of root container 127A) and the cloned PDBs 123A/123B.

In block 161E, the configuration information regarding the PDB 123A clone is exported and saved by host 102 in a configuration file (not shown). The configuration information includes a PDB clone identifier, a PDB clone name, PDB data file locations or any other information.

In block 161F, the PDB 123A clone is dropped from the clone 133B, while the data files associated with the PDB 123A are retained at the storage system 120. This may also be referred to as a "soft delete" operation. Any other PDB, e.g. 123B is also dropped from the clone 133B and data files associated with PDB 123B are deleted. This saves storage space because other PDB clones are not needed for cloning PDB 123A.

In block 161G, the PDB clone is imported into the target CDB 141. It is noteworthy that the target CDB 141 can also be the source CDB 121A. The target CDB 141 may be hosted at a different host system or the same host system as the source CDB 121. This is executed by redirecting pointer 139A from the clone 137 to the PDB clone 129 in the target CDB 141 (shown as pointer 139B). This is faster than copying files performed by conventional inefficient database cloning technology and is also storage space efficient. In one aspect, clone 137 is a "flexclone" created by a flexclone volume. Flexclone volumes are space-efficient because they share the same data blocks with one or more parent volumes that store data for the PDB 123A. The snapshot 133A that is used to create a flexclone volume is shared with the parent volumes.

In block 161H, the clone 133B is deleted. This again saves storage space because the storage system does not have to maintain the clone 133B. The PDB clone 129 is then made available for use from the target CDB 141. The data structures 119 and 125 are updated to indicate the association of PDB clone 129 with the target CDB 141. This information is used to maintain the life cycle of the PDB clone 129, which in this context means maintaining the PDB clone 129 and deleting the PDB clone 129 by the user when it is no longer required. It is noteworthy that if the target CDB 141 having the PDB clone 129 is cloned (not shown) from a backup of the target CDB 141, then the PDB clone 129 can only be deleted when the target CDB 141 clone is deleted.

Figure 1F:
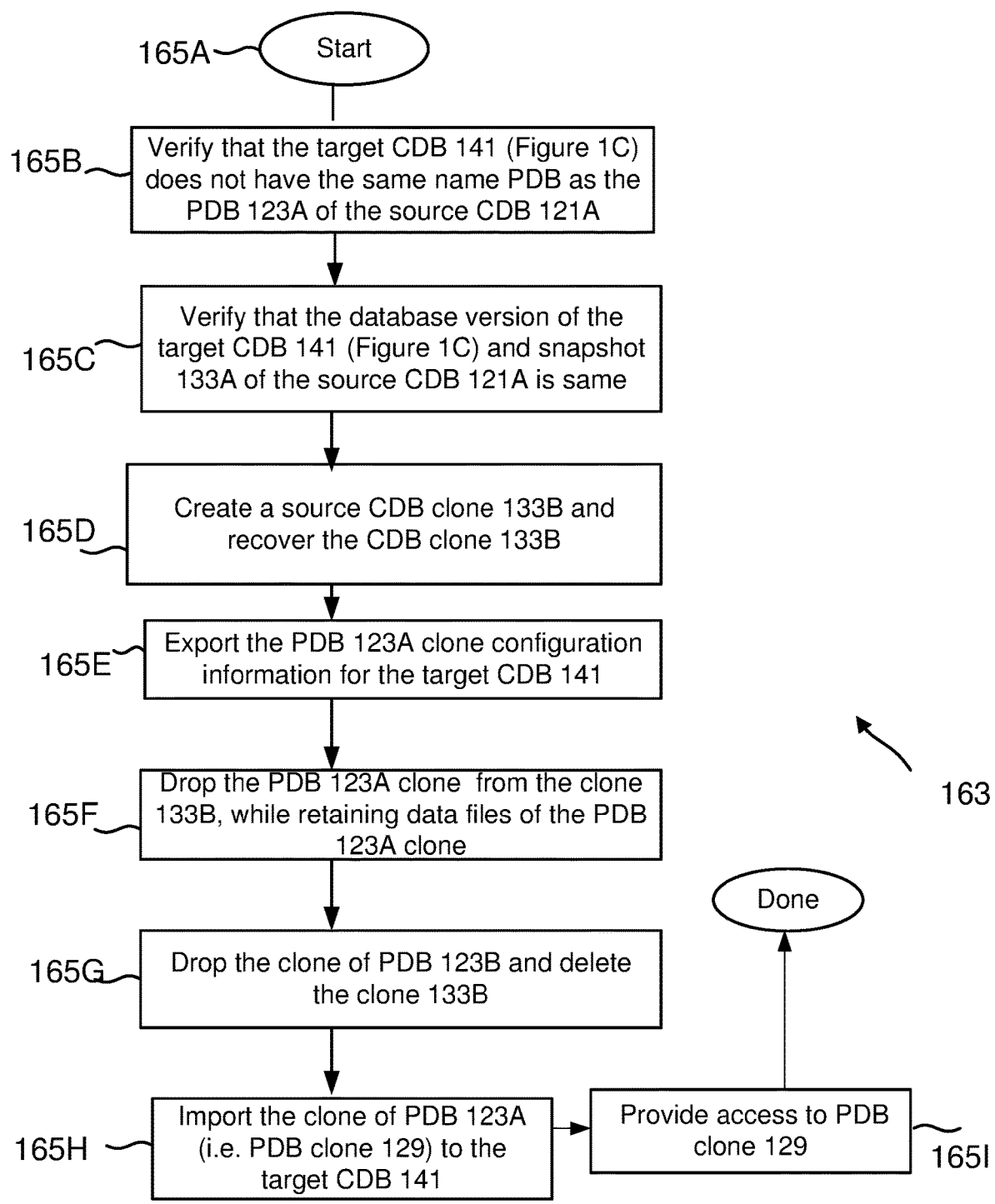
FIG. 1F shows another process for cloning a tenant database from a backup copy of a multitenant database, according to one aspect of the present disclosure.

FIG. 1F shows a detailed process flow 163 for creating the PDB clone 129 at the target CDB 141 from the snapshot 133B, according to one aspect of the present disclosure. Process 163 begins in block 165A after the source CDB 121A has been configured and presented by host 102. As an example, a request to clone PDB 123A is received by the GUI module 142 of the management module 134 (FIG. 1H). The RBAC module 156 verifies that the user request is valid. The cloning module 154 of the management module 134 initiates the cloning process by sending a request to the agent 130 at host 102 to determine if the PDB 123A may be cloned for the target CDB 141.

In block 165B, the database plugin 111 verifies if the target CDB 141 does not already include a PDB 123A clone.

In block 165C, the database version of the target CDB 141 and the snapshot 133B is verified from the data structure 125 by the database plugin 111. This information may be stored in the other metadata 125H (FIG. 1D).

In block 165D, the clone 133B of the snapshot 133A is created. The cloning module 199 of agent 130 (FIG. 1I) coordinates the clone creation. The cloning module 199 sends a request to a storage abstraction layer ("SAL") 173A to create the clone 137 (FIG. 1C) and the SAL 173A forward the request to storage system interface 117. The storage system interface 117 then interfaces with the storage system 120 to configure the clone 137 and one or more storage devices of the storage system 120. The operating system plugin 113 performs any operation that are needed for mounting the clone 133B. The database plugin 113 then creates clone 133B and recovers the complete CDB clone 133B from the snapshot 133A.

In block 165E, the configuration information of the PDB 123A clone is exported by the database plugin 111 to a configuration file (not shown). In block 165F, the database plugin 111 drops the PDB 123A clone from the CDB clone 133B, while associated data files are retained. This is referred to as a "soft delete" operation.

In block 165G, the database plugin 111 drops the other clones, i.e. clone of PDB 123B from the clone 133B. The data files associated with the PDB 123B clone are deleted. Clone 133B is then shutdown and deleted. As mentioned above, this saves storage space because clone 133B and the other PDB clones are deleted.

In block 165H, the database plugin 111 checks the state of the target CDB 141 to determine if the target CDB 141 is still "open." The open state of the target CDB 141 enables an authorized entity (e.g. the database plugin 111) to add a PDB. The PDB clone 129 is imported to the target CDB 141 by redirecting pointer 139A to 139B from the clone 137 (FIG. 1C). As mentioned above, redirecting the pointer is faster than copying datafiles for the PDB clone 129. Furthermore, since no datafiles are copied for the PDB clone 129, it saves storage space at storage devices 114.

Thereafter, access to the PDB clone 129 is provided is provided in block 165I. As mentioned above, access to the PDB clone 129 is provided via the target CDB 141 that can be hosted on a same host as the source CDB 121A or a different host. Furthermore, access to the PDB clone 129 is unrelated to whether the source CDB 121A is operational or shutdown. This enables a user to continue using the source CDB 121A and access the PDB clone 129 at the same time.

Figure 1G:
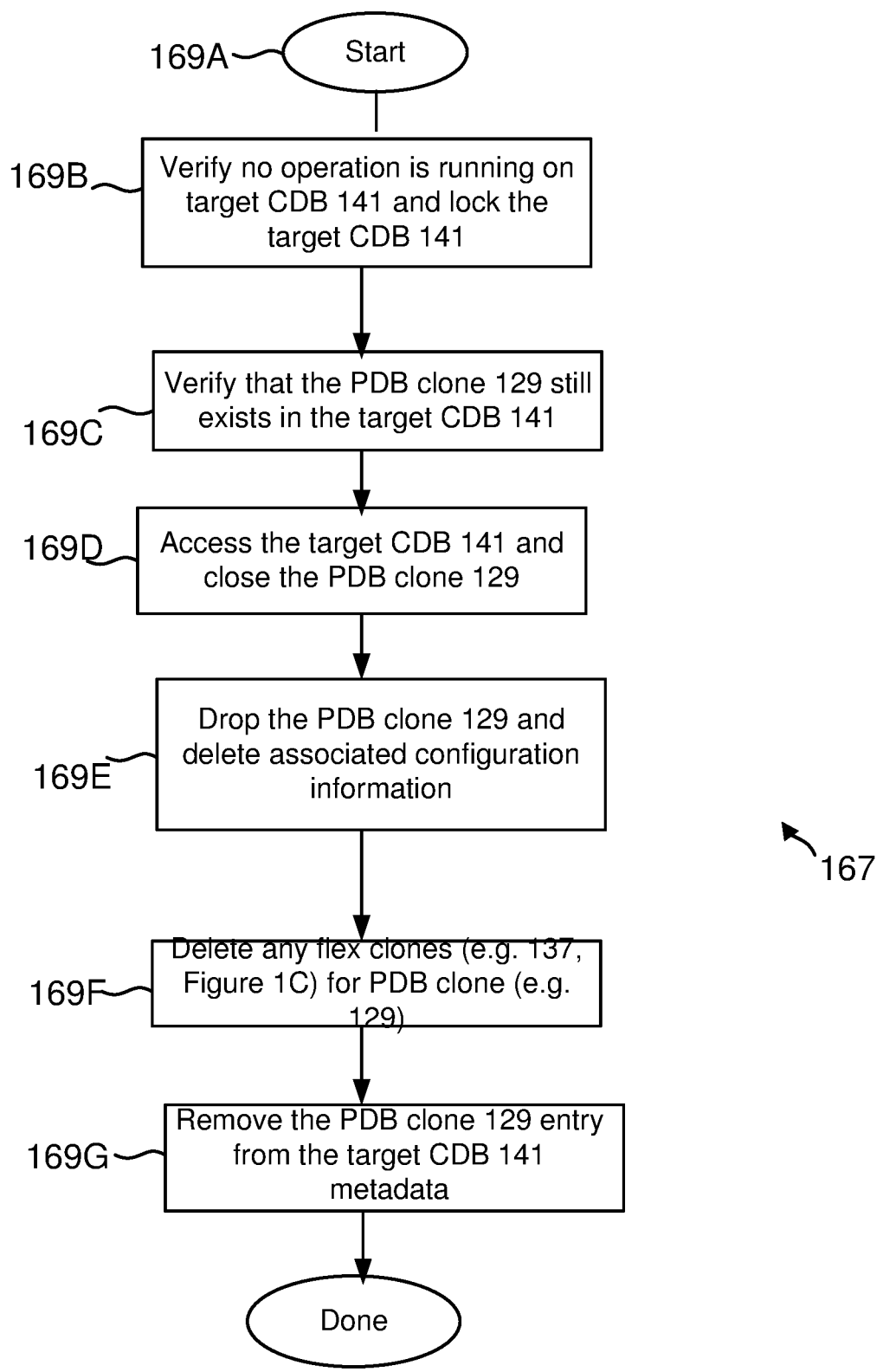
FIG. 1G shows a process for deleting a tenant database clone from a target CDB, according to one aspect of the present disclosure.
Figure 1H:
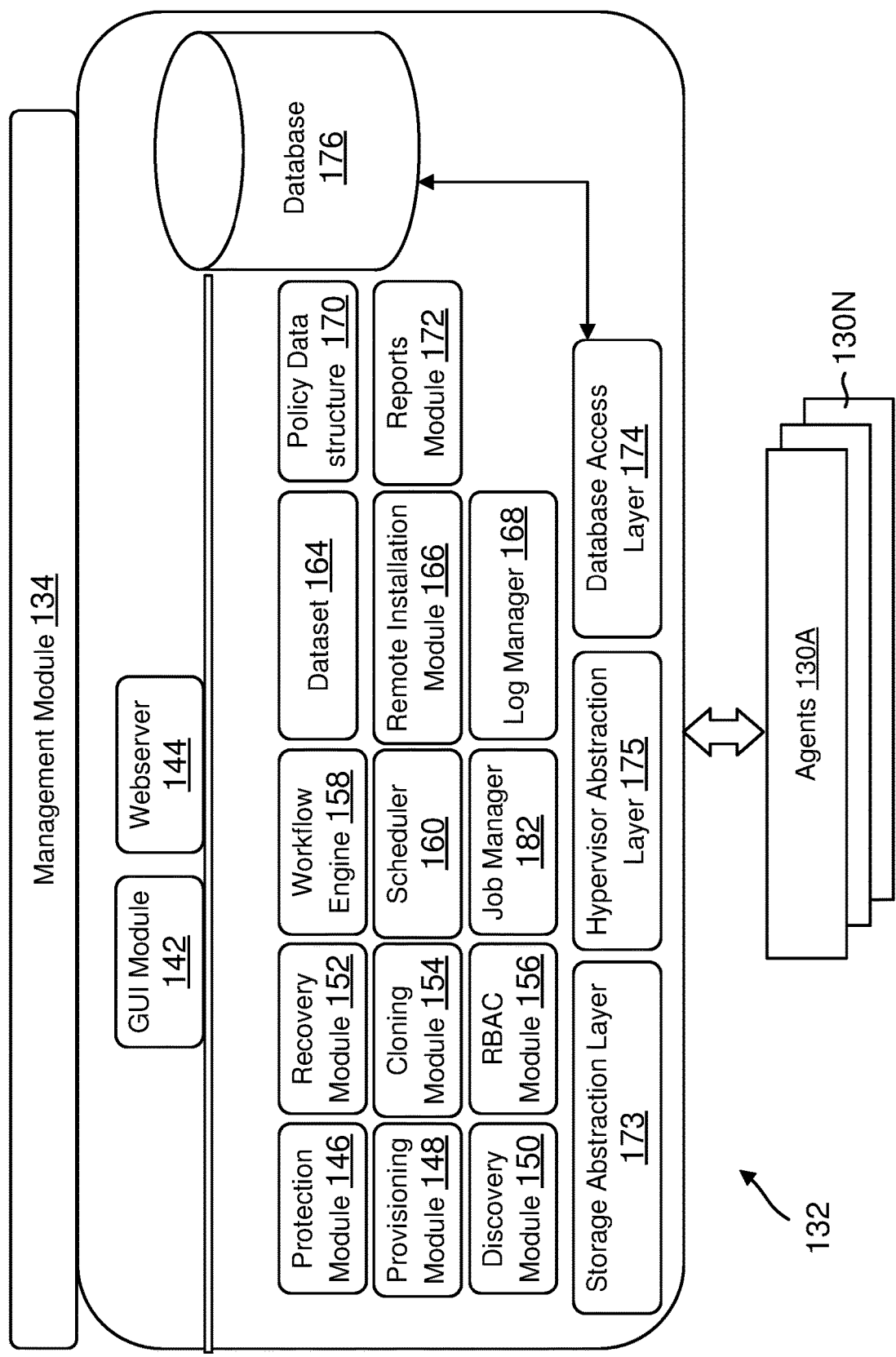
FIG. 1H shows a block diagram of a management module used for backup and restore of a multitenant database system, according to one aspect of the present disclosure.
Figure 1I:
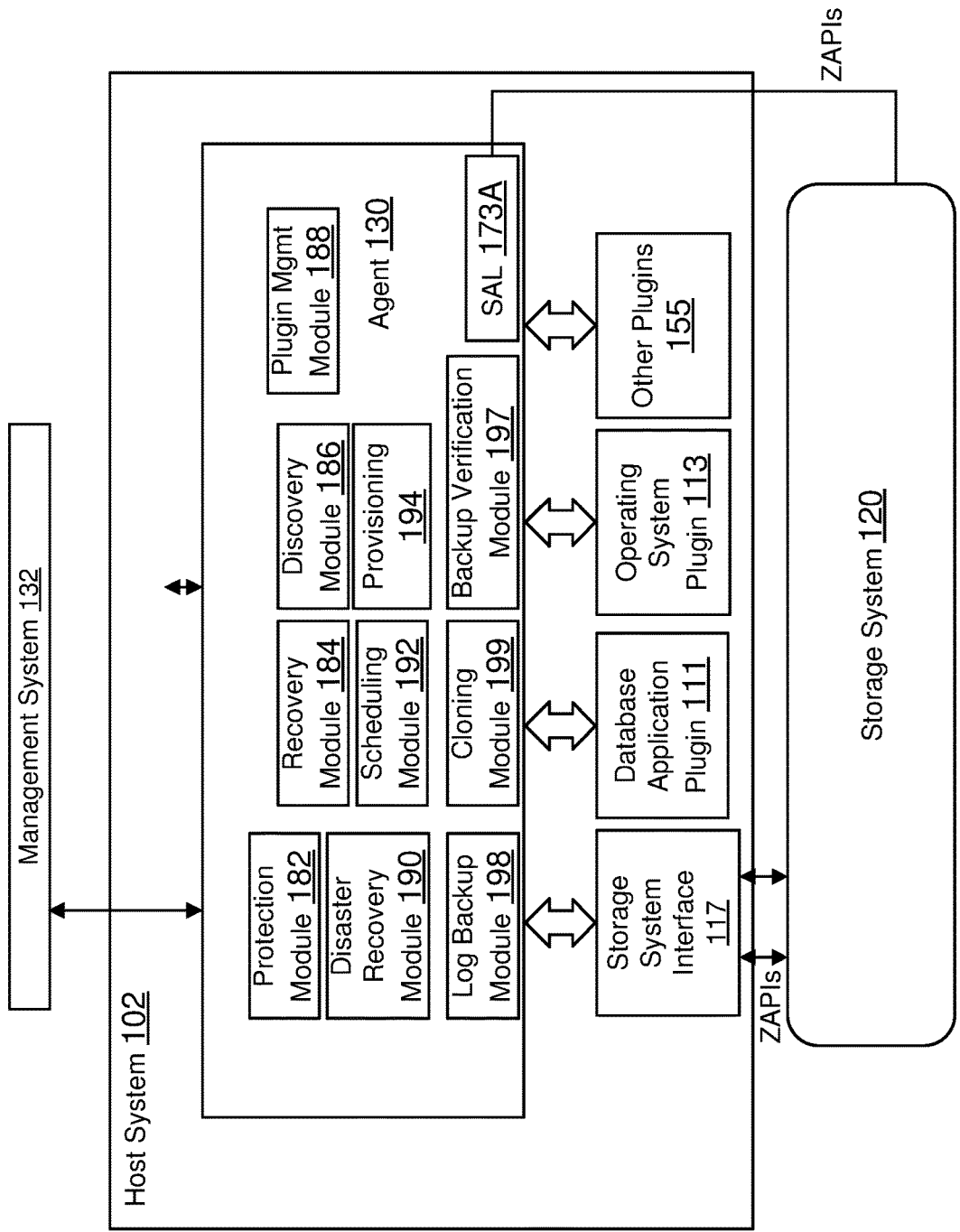
FIG. 1I shows a block diagram of an agent used by a computing system (or host system) for interfacing with the management module and other components of FIG. 1A, according to one aspect of the present disclosure.

FIG. 1G shows a process 167 for deleting a PDB clone from the target CDB 141 as part of PDB clone life cycle management, according to one aspect of the present disclosure. Process 167 begins in block 169A, after a PDB clone 129 has been created, as described above with respect to FIGS. 1E-1F. The delete process begins after the PDB clone 129 is no longer needed. A request to delete PDB clone 129 is received by the management module 134. The RBAC module 156 verifies to determine that the user is authorized to delete the clone.

In block 169B, the target CDB 141 is locked, after verifying that the target CDB 141 is not being used. This operation is executed by the database plugin 111.

In block 169C, the database plugin 111 verifies that the PDB clone 129 still exists within target CDB 141. This is verified by querying the target CDB 141. The target CDB 141 is accessed and the PDB clone 129 is closed i.e. made unavailable.

In block 169E, the PDB clone 129 is dropped/removed from the target CDB 141 and the configuration information regarding the PDB clone is deleted. In block 169F, the clone 137 associated with the PDB clone 129 is deleted and any entry associated with the PDB clone 129 is removed from the target CDB metadata that may be stored in the database 176. Thereafter the process is completed.

In one aspect, innovative technology is provided for cloning a PDB from a snapshot of a source CDB, recovering a clone of the PDB and importing the clone into a target CDB, without having to copy any of the files. This is achieved by using a flexclone volume and redirecting a pointer from the clone PDB in the snapshot to the target CDB. Furthermore, the innovative technology disclosed herein is rooted in computing technology and improves the ability of a storage system and the host system for efficiently cloning PDBs and making them available at any target system.

In one aspect, a method is provided. The method includes accessing, by a processor, a backup (133A, FIG. 1C) of a source container database (121A) of a multitenant database system, the source container database hosting a plurality of tenant databases (123A/123B); generating, by the processor, a clone (133B) of the source container database from the backup, the clone of the source container database including clones of the plurality of tenant databases; exporting, by the processor, configuration information of a clone of a first tenant database from the clone of the source container database to a target container database (141); importing, by the processor, the clone of the first tenant database into the target container database, without copying data files of the PDB clone at the target container database; and removing, by the processor, the clone of the first tenant database from the cloned source container database, while retaining data files associated with the first tenant database. This allows the system to delete the clone 133B and the clone of PDB 123B, while enabling the system to use the data files for the PDB clone 129, without having to copy them.

In yet another aspect, a non-transitory, machine readable storage medium having stored thereon instructions for performing a method, comprising machine executable code is provided. The code when executed by at least one machine, causes the machine to: receive a request to clone a first tenant database of a source container database of a multitenant database system, the source container database hosting a plurality of tenant databases including the first database; identify a backup of the source container database; utilize the backup to generate a clone of the source container database; export configuration information of a clone of the first tenant database from the clone of the source container database to a target container database; import the clone of the first tenant database into the target container database; and provide access to the clone of the first tenant database from the target container database.

Management System 132: FIG. 1H shows a block-level diagram of the management system 132 with the management module 134, according to one aspect of the present disclosure. The management module 134 may be executed by a stand-alone system or may interface with another management console/application to manage and interface with multiple instances of agents' 130A-130N. The management module 134 may also be implemented as an application within a VM environment of host 102A.

The management module 134 includes a graphical user interface (GUI) module 142 that presents a GUI at a display device, for example, a monitor, a smart phone, tablet or any other display device type. The GUIs may be used by different users to interface with the management system 132 and its components, for example, to create a clone of a PDB from a backup of a CDB or delete the clone of a PDB, as described above. It is noteworthy that the various aspects described herein are not limited to any specific GUI type because a command line interface (CLI) may also be used to implement the adaptive aspects described herein.

The management module 134 may also include a web server 144 for enabling Internet based communication. As an example, web server 144 may be implemented as an Internet Information Services (IIS) for a Windows® Server web server (without derogation of any third-party trademark rights). The web server 144 interfaces with a workflow engine 158 that coordinates and manages various tasks that are performed by the different components of the management module 134 including cloning the PDB 123A and deleting the clone, as described above in detail.

In one aspect, the workflow engine 158 coordinates dataset 164 creation, policy allocation and manage a database 176 that is different from the databases 121/123A-123N, described above. The workflow engine 158 communicates with various agents 130A-130N for host system related operations including backup and restore of databases 121/123A-123N.

In one aspect, the management module 134 also includes a protection module 146, a provisioning module 148, a discovery module 150, a recovery module 152, a cloning module 154, a role based access control (RB AC) module 156, a storage abstraction layer (may also be referred to as "SAL") 173, a hypervisor abstraction layer (may also be referred to as "HAL") 175, a scheduler 160, a job manager 182, a remote installation module 166, a log manager 168, a policy data structure 170, a reports module 172 and a database access layer 174 that can access the database (or any other data structure type) 176. The database 176 stores various data structures (or objects) including data structures 119 and 125, in a format that allows the management module 134 to handle storage services for different applications/host systems.

The log manager 168 collects logs from agents 130 and the various plugins. The logs can then be presented to a user via a GUI. The logs may be for event management and audit for various management system 132 operations. The logs may be collected for a job based on a job identifier.

The protection module 146 is used to enforce a policy for a storage services related job (e.g. backup and/or restore of a tenant database). The protection module 146 maintains a protection policy for a plurality of objects (or protection group) that are to be backed up, including the source CDB 121A and provides protection service for backing up the protection group objects. Based on an application object, a call is made to an appropriate plugin for providing the appropriate protection service.

In one aspect, the protection module 146 maintains protection group objects for abstract representation of a container of application objects where protection of application objects is defined by policy objects. The protection group objects map to dataset objects 164 (shown as dataset 164).

The provisioning module 148 allows a user to configure and provision a LUN/volume (used interchangeably) that may be used to store information (e.g. for a multitenant database system). The provisioning module 148 allows a user to set a LUN size and appropriate permissions for using the LUN, for example, reading and writing data, permission for changing a LUN size, deleting a LUN and other operations. Storage volume information is saved in a standard format at database 176 and includes, name of the storage volume, storage connection identifier (described below), size, a junction path, date volume was created and an aggregate.

The discovery module 150 interfaces with the agents 130A-130N executed at different host systems to obtain information regarding the host systems, storage resources used by various applications and information regarding data containers that are protected (i.e. backed up) and unprotected. The discovery module 150 also facilitates discovery and management of application specific objects, for example, VMs, databases, hypervisor and others. Based on the application type, an appropriate plugin is used to discover different objects.

In one aspect, the discovery module 150 initiates a discovery operation with the agents 130. An application programming interface (API) presented by the management module 134 determines if an agent 130 is installed at a host 102. If the agent 130 is installed, then the agent 130 discovers the various plugins at that host 102. If the agent 130 is not installed, then it is installed by the remote installation module 166 and the appropriate plugins are installed as well.

The cloning module 154 is used to clone storage volumes that are maintained by the storage system 120 e.g. clone 137 (FIG. 1C). The cloning module 154 is also used for managing the life cycle of a clone. The term clone as used herein is a duplicate copy of a snapshot. The term clone life cycle management means generating a clone, and deleting a clone by the user when it is no longer required.

The RBAC module 156 stores information regarding different clients/entities that are given access to storage. For example, a business unit may be allowed to read certain storage volumes and may not be allowed to backup, clone, replicate or delete any storage volume. The RBAC module 156 manages the various roles and access type for different applications that may be executed in different host systems/computing environments including a multitenant database environment described above.

In one aspect, RBAC module 156 includes an authentication and authorization module. User authentication may happen at multiple end points, for example, via a GUI login, a login API for clients or plugins and others. The authentication module authenticates users against different domain/subsystem requirements, for example, an Active Directory, a local Windows machine host system, open LDAP (lightweight directory protocol) and others. Once a user is authenticated, an encrypted token is generated based on user information. In another aspect, a hash token is generated based on the generated token. The hashed token is saved at database 176. The hashed token may be based on MD5 (Message Digest Algorithm, 5, SHA (secure hash algorithm)-1 or any other technique.

When the authenticated user logs back in, the user passes the token and the management system 132 decrypts the token, validates the token and regenerates the hash value. The hash value is compared with the stored hash value in database 176.

In one aspect, the authorization module of the RBAC module 156 creates custom roles (for example, an administrator, backup administrator, backup operator, backup viewer, restore administrator and others), modifies existing roles, assigns and unassigns permissions to and from a role (for example, a dataset, policy, host, storage connection, a dashboard, a report, discovery, remote installation and others), assigns and unassigns users to roles and assigns and unassigns resources (for example, hosts, datasets, policy and others).

In one aspect, roles determine a set of capabilities that are available to members of the role. For example, a backup administrator may be allowed to add a host system, add a tenant database, install plugins, create a dataset, create a backup dataset, delete a dataset, create policies, delete backups, restore applications and others. A backup operator may be allowed to start and stop existing dataset jobs, monitor backups, view backup reports and perform application level restore operations. A backup viewer may be given read only access to backups, view existing backups and review job session details. A restore administrator may be allowed to perform restore operations using existing backups of multitenant databases. The adaptive aspects described herein are not limited to these roles.

All the tasks conducted by the management module 134 are organized and monitored by the job manager 182. The job schedules are managed by the scheduler 160. When a new job arrives (e.g. to take a backup of CDB database 121/PDBs 123A-123N), the job manager 182 stores the job information in a database (for example, 176) with other existing jobs. The job manager 182 creates sub-tasks for executing the appropriate workflows. The sub-tasks depend on the nature of the job (for example, backup, restore, cloning or others). The job manager 182 updates the status of each task to provide real-time updates via a GUI.

In one aspect, the policy data structure 170 is used to store polices for different stored objects (for example, databases 121/123A-123N, data structures, VMs, storage volumes and others). The policy information is configurable and may be changed by a user. In one aspect, the policy data structure 170 format is the same across different applications. This enables the management module 134 to manage storage services across different platforms with different requirements and operating parameters. The policy data structure 170 includes various policy objects to store various policies each with a set of attributes that may be applied to any dataset. The policy object stores a policy identifier, a policy name, description, a backup schedule policy, a retention count as to how long a backup is to be retained, a replication policy to replicate a backup from one location to another, types of backups, application consistent backups, and verification policies to verify a backup and others. It is noteworthy that a policy object may be shared across multiple datasets for multiple applications/plugins.

The reports module 172 is used to provide reports to users. The reports may be for different applications and in different formats.

In one aspect, the management module 134 maintains the dataset 164 for different applications and application objects, including databases 121/123A-123N. Each dataset is uniquely identified and named. The dataset format for managing replication for different applications is the same, regardless of how the applications handle information. A dataset may be associated with a policy data structure that defines how an object is to be protected. The dataset format used by the various aspects of the present disclosure allows a user to add or remove stored objects that need to be protected.

In one aspect, dataset 164 represents a container of application objects where protection attributes may be defined in terms of backup policy, replication profiles and retention policies. Dataset 164 is a basic unit that is used to manage backup, restore and cloning operations described above. A user can add any permissible resource to the dataset from multiple host systems/applications.

The database access layer 174 saves information in the database 176. The database 176 may be used to store information that is discovered by the discovery module 150, policy information, host information, datasets and other information.

In one aspect, the database 176 may store various data structures for managing the storage services and providing status to users including data structures 119 and 125 (FIG. 1D) and metadata for CDBs, including the target CDB 141 (FIG. 1C). As an example, the database schema for the database 176 is application format independent and may include various data structures to identify different host systems to specific login information, a backup metadata structure for storing information regarding backups, a data structure to map backups to stored objects including VMs, databases and others, a data structure for storing information on backup types, i.e. application consistent, full backup, copy backup, log backup for identifying volumes that are involved in each backup, a data structure to track various jobs that are managed by the job manager 182, discovery objects for storing information that is discovered by the discovery module 150, policy data structure 170, storage footprint and storage resource information, a data structure for storing information regarding various plugins, roles, role attributes, storage connections and user information, including credentials.

In one aspect, SAL 173 stores information regarding the various storage resources that are used and available for different hosts including host 102 of FIG. 1B that hosts a multitenant database system. SAL 173 maintains a "storage footprint" or storage layout for different storage resources (for example, storage systems including storage devices) used by different applications as described below in detail.

In one aspect, HAL 175 is used to communicate with another plugin that is used to collect information related to storage used by different virtual machines.

Agent 130: FIG. 1I shows an example of the agent 130 that interfaces with the management system 132 and the various plugins shown in FIG. 1B, according to one aspect. The agent 130 includes a protection module 182 to manage and coordinate backup and cloning operations for multi-tenant databases, a recovery module 184 to manage and coordinate restore operations to restore a tenant database, a discovery module 186 to manage and coordinate discovery operations described above with respect to FIG. 1C, a plugin management module 188 to manage plugin installation at host 102, a disaster recovery module 190 to manage and coordinate disaster recovery operations, a scheduling module 192 to schedule tasks, for example, backup, cloning and restore operations described above, a provisioning module 194 for provisioning computing and storage resources (e.g. for a tenant database of a multitenant database system), a log backup module 198 for managing logs for backup operations, a cloning module 199 for managing cloning operations described above, a backup verification module 197 for managing and coordinating backup verification operations and SAL 173A for communicating with the storage system 120.

SAL 173A maintains the storage footprint/layout for each application. SAL 173A interfaces with each plugin (e.g. database plugin 111) to obtain storage resources that are managed by storage system 120 and made available to different applications. In one aspect, SAL 173A uses ZAPIs (Zephyr Application Programming Interface) to send and receive data from storage system 120.

In another aspect, the agent 130 interfaces with storage system 120 via the storage system interface 117. An example of storage system interface is SnapDrive provided by NetApp Inc. (without derogation of any trademark rights of NetApp Inc.).

The agent 130 interfaces with different types of plugins, for example, plugins 111, 113 and 155. The database plugin 111 is aware of CDB database 121 format and configuration and provides database specific information to the agent 130.

The backup verification module 197 verifies a backup or replication operation. Since different applications may have different requirements, the backup verification module 197 facilitates the verification for different applications.

The cloning module 199 assists in cloning a snapshot, as described above and a log backup module 198 assists in backing up logs. As an example, a database application 107 (FIG. 1B) may maintain a log to track changes to a database and the log backup module 198 assists in backing up those logs.

Figure 2A:
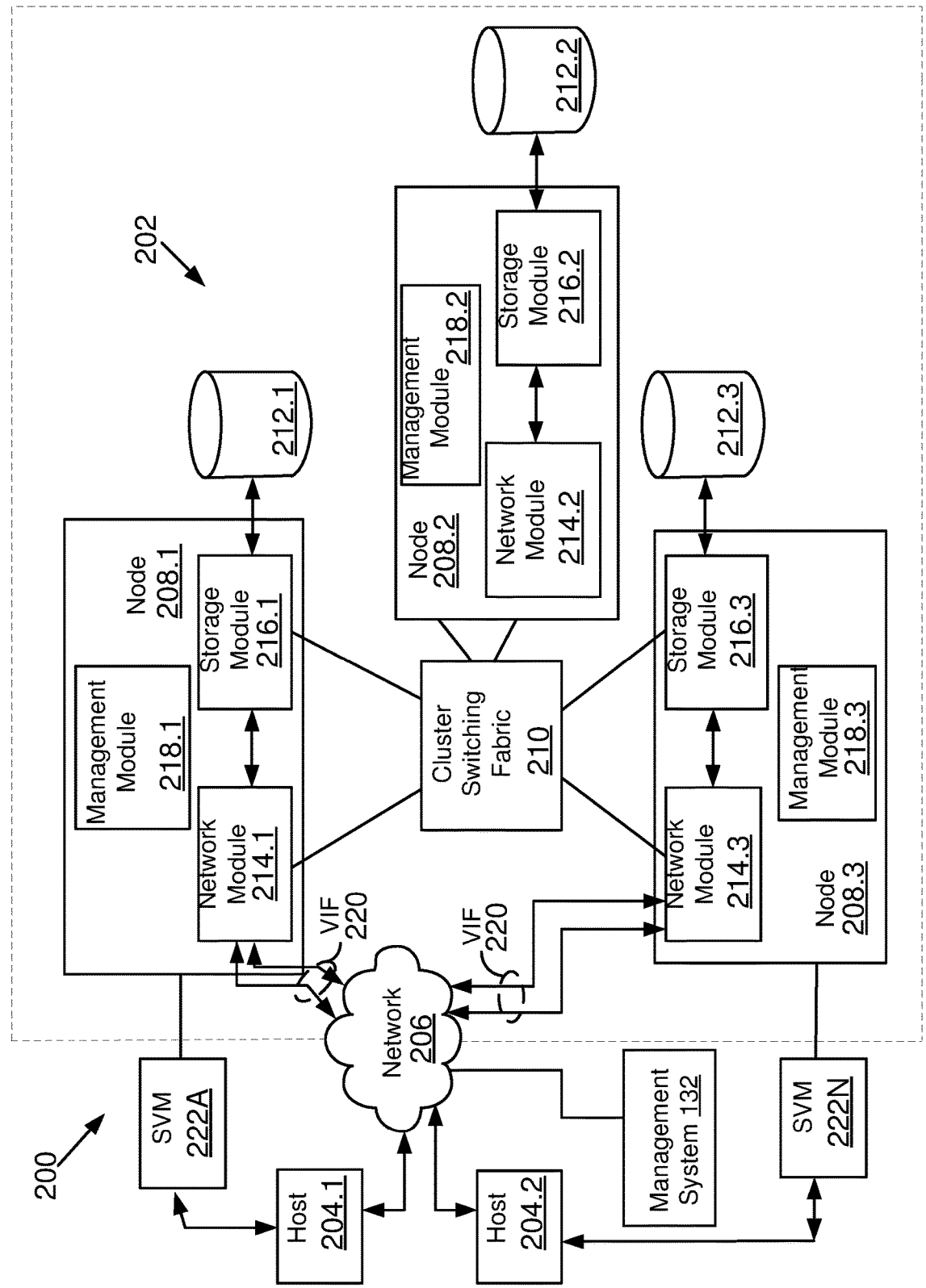
FIG. 2A shows an example of a cluster-based storage system, used according to one aspect of the present disclosure.

Clustered Storage System: FIG. 2A depicts an illustrative aspect of a shared, storage environment 200, similar to storage system 120 that stores the clone 137 (FIG. 1C) described above in detail. The shared, storage environment 200 includes the management system 132 described above, a plurality of server systems 204.1-204.2 (similar to server systems 102), a clustered storage system 202 and at least one computer network 206 communicably connecting the server systems 204.1-204.2 and the clustered storage system 202.

The clustered storage system 202 includes a plurality of nodes 208.1-208.3, a cluster switching fabric 210, and a plurality of mass storage devices 212.1-212.3 (similar to 114 FIG. 1A). Each of the plurality of nodes 208.1-208.3 is configured to include a network module, a storage module, and a management module, each of which may be implemented as a separate processor executable or machine implemented module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enables the respective nodes 208.1-208.3 to connect to one or more of the client systems 204.1-204.2 over the computer network 206, while the storage modules 216.1-216.3 connect to one or more of the storage devices 212.1-212.3.

The management modules 218.1-218.3 provide management functions for the clustered storage system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective network modules 214.1-214.3 and the client systems 204.1-204.2, allowing storage 212.1-212.3 associated with the nodes 208.1-208.3 to be presented to the client systems 204.1-204.2 as a single shared storage pool. For example, the switched virtualization layer may implement a virtual interface architecture. FIG. 2A depicts only the VIFs 220 at the interfaces to the network modules 214.1, 214.3 for clarity of illustration.

The clustered storage system 202 may be organized into any suitable number of virtual servers (VServer or storage virtual machines (SVM)) 222A-222N, in which each virtual storage system represents a single storage system namespace with separate network access. Each virtual storage system has a user domain and a security domain that are separate from the user and security domains of other virtual storage systems. Server systems 204 can access storage space via a VServer from any node of the clustered system 202.

Each of the nodes 208.1-208.3 may be defined as a computer adapted to provide application services to one or more of the client systems 204.1-204.2. In this context, a SVM is an instance of an application service provided to a client system. The nodes 208.1-208.3 are interconnected by the switching fabric 210, which, for example, may be embodied as a Gigabit Ethernet switch or any other switch type.

Although FIG. 2A depicts three network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules.

The server systems 204.1-204.2 (similar to host systems 102A-102N of FIG. 1A) of FIG. 2A may be implemented as computing devices configured to interact with the respective nodes 208.1-208.3 in accordance with a client/server model of information delivery. In the presently disclosed aspect, the interaction between the server systems 204.1-204.2 and the nodes 208.1-208.3 enable the provision of network data storage services. Specifically, each server system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The server systems 204.1-204.2 may issue packets according to file-based access protocols, such as the NFS or CIFS protocol, when accessing information in the form of files and directories.

In a typical mode of operation, one of the server systems 204.1-204.2 transmits an NFS or CIFS request for data (e.g. associated with the PDB 123A) to one of the nodes 208.1-208.3 within the clustered storage system 202, and the VIF 220 associated with the respective node receives the client request. It is noted that each VIF 220 within the clustered system 202 is a network endpoint having an associated IP address. The server request typically includes a file handle for a data file stored in a specified volume on at storage 212.1-212.3.

Figure 2B:
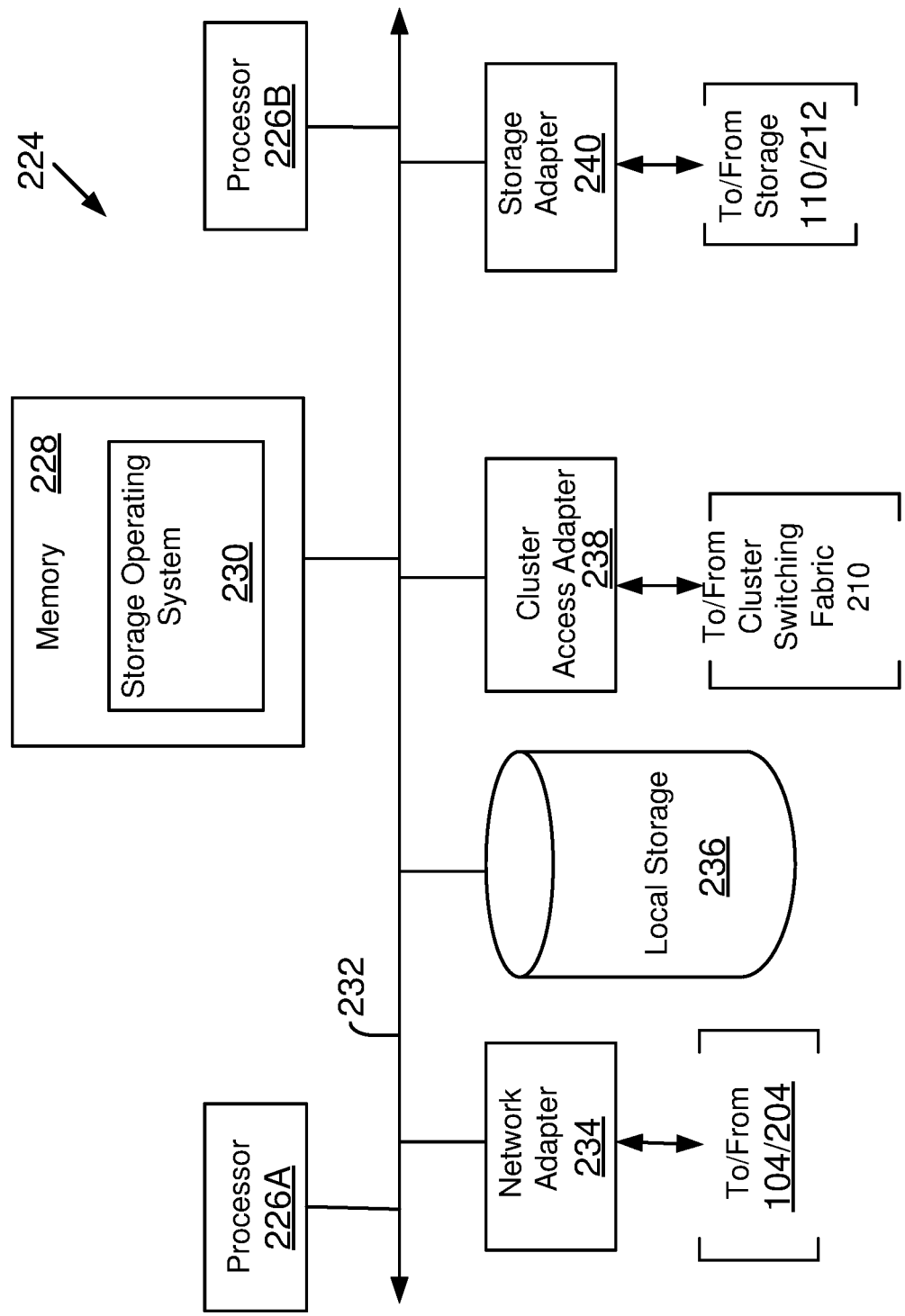
FIG. 2B shows an example of a storage system node, used according to one aspect of the present disclosure.

Storage System Node: FIG. 2B is a block diagram of a system 224, according to one aspect. System 224 may be used by a stand-alone storage system 120 and/or a storage system node operating within a clustered storage system node for performing various storage services described above with respect to FIGS. 1B-1G. System 224 communicates with SAL 173A and/or storage system interface 117 for providing information regarding stored objects, backups, clones, restore operations and others as described above.

System 224 may include a plurality of processors 226A and 226B, a memory 228, a network adapter 234, a cluster access adapter 238 (used for a cluster environment), a storage adapter 240 and local storage 236 interconnected by a system bus 232. The local storage 236 comprises one or more storage devices utilized by the processors to locally store configuration and other information.

The cluster access adapter 238 comprises a plurality of ports adapted to couple system 224 to other nodes of a cluster as described above with respect to FIG. 2A. In the illustrative aspect, Ethernet may be used as the clustering protocol and interconnect media, although it will be apparent to those skilled in the art that other types of protocols and interconnects may be utilized within the cluster architecture described herein.

System 224 is illustratively embodied as a dual processor storage system executing a storage operating system 230 (similar to 124, FIG. 1A) that preferably implements a high-level module, such as a file system, to logically organize information as a hierarchical structure of named directories, files and special types of files called virtual disks (hereinafter generally "blocks") on storage devices 114/212. However, it will be apparent to those of ordinary skill in the art that the system 224 may alternatively comprise a single or more than two processor systems. Illustratively, one processor 226 executes the functions of a network module on a node, while the other processor 226B executes the functions of a storage module.

The memory 228 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions described herein.

The storage operating system 230 (or 124, FIG. 1A), portions of which is typically resident in memory and executed by the processing elements, functionally organizes the system 224 by, inter alia, invoking storage operations in support of the storage service provided by storage system 120. An example of operating system 230 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 234 comprises a plurality of ports adapted to couple the system 224 to one or more server systems over point-to-point links, wide area networks, virtual private networks implemented over a public network (Internet) or a shared local area network. The network adapter 234 thus may comprise the mechanical, electrical and signaling circuitry needed to connect storage system 120 to the network. Illustratively, the computer network may be embodied as an Ethernet network or a FC network.

The storage adapter 240 cooperates with the storage operating system 230 executing on the system 224 to access information requested by the management system 132 and/or host 102. The information may be stored on any type of attached array of writable storage device media such as optical devices, DVD, magnetic tape, bubble memory, electronic random-access memory, flash memory devices, micro-electro mechanical and any other similar media adapted to store information.

The storage adapter 240 comprises a plurality of ports having input/output (I/O) interface circuitry that couples to storage devices over an I/O interconnect arrangement, such as a conventional high-performance, FC link topology.

In another aspect, instead of using a separate network and storage adapter, a converged adapter is used to process both network and storage traffic.

Figure 3:
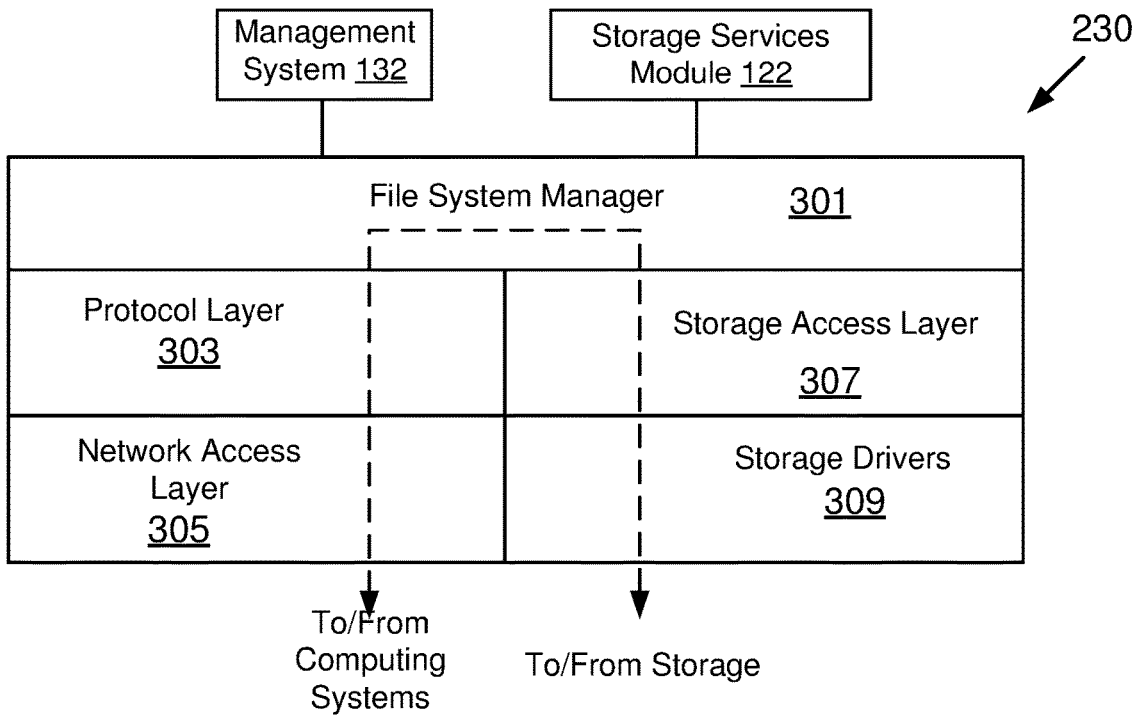
FIG. 3 shows an example of a storage operating system, used according to one aspect of the present disclosure.

Storage Operating System: FIG. 3 illustrates a generic example of storage operating system 230 (or 124) executed by storage system 120 and interfacing with the management system 132, the storage services module 122 and storage system interface 117/SAL 173A, according to one aspect of the present disclosure. The storage operating system 230 maintains various stored objects and data containers. Storage system interface 117 and/or SAL 173A communicates with different layers of storage operating system 230 for providing storage services in system 100 including cloning a PDB 123A/123N, described above in detail.

As an example, operating system 230 may include several modules, or "layers". These layers include a file system manager 301 that keeps track of a directory structure (hierarchy) of the data stored in storage devices and manages read/write operations, i.e. executes read/write operations on storage devices in response to server system 102 requests.

Operating system 230 may also include a protocol layer 303 and an associated network access layer 305, to allow system 200 to communicate over a network with other systems, such as server system 102 and management system 132. Protocol layer 303 may implement one or more of various higher-level network protocols, such as NFS, CIFS, Hypertext Transfer Protocol (HTTP), TCP/IP and others, as described below.

Network access layer 305 may include one or more drivers, which implement one or more lower-level protocols to communicate over the network, such as Ethernet. Interactions between server systems 102 and mass storage devices 114/212 are illustrated schematically as a path, which illustrates the flow of data through operating system 230.

The operating system 230 may also include a storage access layer 307 and an associated storage driver layer 309 to communicate with a storage device. The storage access layer 307 may implement a higher-level storage protocol, such as RAID (redundant array of inexpensive disks), while the storage driver layer 309 may implement a lower-level storage device access protocol, such as FC, SCSI or any other protocol.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 120.

As used herein, the term "storage operating system" generally refers to the computer-executable code operable on a computer to perform a storage function that manages data access and may implement data access semantics of a general-purpose operating system. The storage operating system can also be implemented as a microkernel, an application program operating over a general-purpose operating system, such as UNIX® or Windows®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure may be adapted to a variety of storage system architectures including, but not limited to, a network-attached storage environment, a storage area network and a disk assembly directly attached to a client or host computer. The term "storage system" should therefore be taken broadly to include such arrangements in addition to any subsystems configured to perform a storage function and associated with other equipment or systems.

Figure 4:
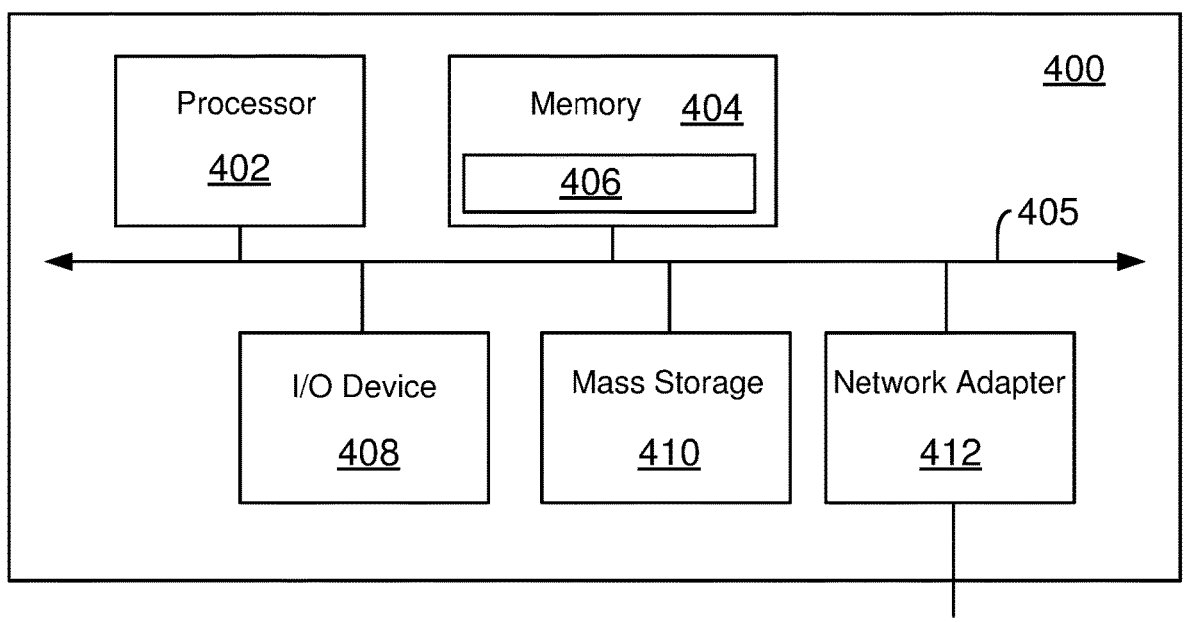
FIG. 4 shows an example of a processing system, used according to one aspect of the present disclosure.

Processing System: FIG. 4 is a high-level block diagram showing an example of the architecture of a processing system, at a high level, in which executable instructions as described above may be implemented. The processing system 400 can represent modules of the management system 132, host 102, and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random-access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code used for executing the process blocks of FIGS. 1E-1G, data structures 119 and 125, agent 130, management module 134 and the various plugins/applications.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing: The system and techniques described above are applicable and especially useful in the cloud computing environment where storage is presented and shared across different platforms. Cloud computing means computing capability that provides an abstraction between the computing resource and its underlying technical architecture (e.g., servers, storage, networks), enabling convenient, on-demand network access to a shared pool of configurable computing resources that may be rapidly provisioned and released with minimal management effort or service provider interaction. The term "cloud" is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer is a cloud platform and cloud infrastructure, followed by a "server" layer that includes hardware and computer software designed for cloud specific services. The storage systems described above may be a part of the server layer for providing storage services. Details regarding these layers are not germane to the inventive aspects.

Thus, a method and apparatus for protecting multitenant databases have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
   accessing, by a processor, a backup of a source container database of a multitenant database system, the source container database hosting a plurality of tenant databases;
   generating, by the processor, a clone of the source container database from the backup, the clone of the source container database including clones of the plurality of tenant databases;
   exporting, by the processor, configuration information of a clone of a first tenant database from the clone of the source container database to a target container database;
   verifying, by the processor, that the target database container does not include the clone of the first tenant database with a same name;
   in response to the verifying, importing, by the processor, the clone of the first tenant database into the target container database by redirecting a reference to the clone of the first tenant database to the target container database, without copying data files of the first tenant database; and
   removing, by the processor, the clone of the first tenant database from the clone of the source container database, while retaining data files associated with the first tenant database for use by the clone imported to the target container database.

2. The method of claim 1, further comprising: providing, by the processor, access to the clone of the first tenant database from the target container database.

3. The method of claim 1, further comprising: deleting, by the processor, the cloned source container database, upon importing the clone of the first tenant database to the target container database.

4. The method of claim 1, further comprising: renaming, by the processor, the first tenant database from the clone of the source container database to uniquely identify the clone of the first tenant database.

5. The method of claim 1, further comprising: selecting, by the processor, the target container database on a computing device different from the source container database.

6. The method of claim 1, further comprising: selecting, by the processor, the source container database as the target container database.

7. The method of claim 1, wherein importing the clone of the first tenant database into the target container database further comprising:
   redirecting, by the processor, a pointer from the clone of the first tenant database to the target container database.

8. A non-transitory, machine readable storage medium having stored thereon instructions for performing a method, comprising machine executable code which when executed by at least one machine, causes the machine to:
   receive a request to clone a first tenant database of a source container database of a multitenant database system, the source container database hosting a plurality of tenant databases including the first tenant database;
   identify a backup of the source container database;
   utilize the backup to generate a clone of the source container database;
   export configuration information of a clone of the first tenant database from the clone of the source container database to a target container database;
   import the clone of the first tenant database into the target container database by redirecting a reference to the clone of the first tenant database to the target container database, without copying data files associated with the first tenant database;
   remove the clone of the first tenant database from the clone of the source container database, while retaining the data files; and
   provide access to the clone of the first tenant database from the target container database using the retained data files.

9. The non-transitory machine readable storage medium of claim 8, wherein the machine executable code further causes the machine to: prior to importing the clone, verify that the target database container does not include the clone of the first tenant database with a same name.

10. The non-transitory machine readable storage medium of claim 8, wherein the machine executable code further causes the machine to: delete the cloned source container database, upon importing the clone of the first tenant database to the target container database.

11. The non-transitory machine readable storage medium of claim 8, wherein the machine executable code further causes the machine to: rename the first tenant database to uniquely identify the clone of the first tenant database.

12. The non-transitory machine readable storage medium of claim 8, wherein the machine executable code further causes the machine to: select the target container database on a computing device different from the source container database.

13. The non-transitory machine-readable storage medium of claim 8, wherein the machine executable code further causes the machine to: select the source container database as the target container database.

14. The non-transitory machine readable storage medium of claim 8, wherein the machine executable code further causes the machine to: redirect a pointer from the clone of the first tenant database to the target container database.

15. A system, comprising:
a memory containing machine readable medium comprising machine executable code having stored thereon instructions; and a processor coupled to the memory, the processor configured to execute the machine executable code to:
receive a request to clone a first tenant database of a source container database of a multitenant database system, the source container database hosting a plurality of tenant databases including the first tenant database;
identify a backup of the source container database;
utilize the backup to generate a clone of the source container database;
export configuration information of a clone of the first tenant database from the clone of the source container database to a target container database;
import the clone of the first tenant database into the target container database by redirecting a reference to the clone of the first tenant database to the target container database, without copying data files associated with the first tenant database;
remove the clone of the first tenant database from the clone of the source container database, while retaining the data files; and
provide access to the clone of the first tenant database from the target container database using the retained data files.

16. The system of claim 15, wherein the processor further causes the machine executable code to: prior to importing the clone, verify that the target database container does not include the clone of the first tenant database with a same name.

17. The system of claim 15, wherein the processor further causes the machine executable code to: delete the cloned source container database, upon importing the clone of the first tenant database to the target container database.

18. The system of claim 15, wherein the processor further causes the machine executable code to: rename the first tenant database to uniquely identify the clone of the first tenant database.

19. The system of claim 15, wherein the processor further causes the machine executable code to: select the target container database on a computing device different from the source container database.

20. The system of claim 15, wherein the processor further causes the machine executable code to: select the source container database as the target container database.

* * * * *